United States Patent
Stefanski et al.

(10) Patent No.: US 12,458,036 B2
(45) Date of Patent: Nov. 4, 2025

(54) OXIDATIVELY STABLE POLYUNSATURATED FATTY ACID CONTAINING OIL

(71) Applicant: DSM IP Assets B.V., Heerlen (NL)

(72) Inventors: Michael Lenn Stefanski, Winchester, KY (US); Xuejun Tang, Ellicott City, MD (US); Kristine Sheila Crawford, Ellicott City, MD (US)

(73) Assignee: DSM IP Assets B.V. (NL)

(*) Notice: Subject to any disclaimer, the term of this patent is extended or adjusted under 35 U.S.C. 154(b) by 691 days.

(21) Appl. No.: 14/446,218

(22) Filed: Jul. 29, 2014

(65) Prior Publication Data

US 2015/0017304 A1    Jan. 15, 2015

Related U.S. Application Data

(63) Continuation of application No. 13/694,134, filed on Nov. 1, 2012, now abandoned.
(Continued)

(51) Int. Cl.
| | | |
|---|---|---|
| A23B 2/733 | (2025.01) | |
| A23B 2/771 | (2025.01) | |
| A23B 20/30 | (2025.01) | |
| A23D 9/007 | (2006.01) | |
| A23L 27/00 | (2016.01) | |
| A23L 33/115 | (2016.01) | |
| C11B 5/00 | (2006.01) | |

(52) U.S. Cl.
CPC .............. *A23B 2/733* (2025.01); *A23B 2/771* (2025.01); *A23B 20/30* (2025.01); *A23D 9/007* (2013.01); *A23L 27/82* (2016.08); *A23L 33/115* (2016.08); *C11B 5/0007* (2013.01); *C11B 5/0085* (2013.01); *C11B 5/0092* (2013.01); *A23V 2002/00* (2013.01)

(58) Field of Classification Search
CPC ........ A23V 2002/00; A23V 2250/1868; A23V 2250/187; A23V 2250/1882; A23L 27/82
See application file for complete search history.

(56) References Cited

U.S. PATENT DOCUMENTS

| 5,068,115 A | 11/1991 | Liebermann |
|---|---|---|
| 5,077,069 A | 12/1991 | Chang et al. |
| (Continued) | | |

FOREIGN PATENT DOCUMENTS

| CL | 48027 | 11/2011 |
|---|---|---|
| CL | 48745 | 12/2012 |
| (Continued) | | |

OTHER PUBLICATIONS

Jacobsen et al., "Oxidation in Fish Oil Enriched Mayonnaise: Ascorbic Acid and Low pH Increase Oxidative Deterioration". J. Agric Food Chem. 2001, 49, 3947-3956. (Year: 2001).*
(Continued)

*Primary Examiner* — Erik Kashnikow
*Assistant Examiner* — Assaf Zilbering
(74) *Attorney, Agent, or Firm* — Jed C. Benson

(57) ABSTRACT

An oil comprising (i) at least 30 wt. % of one or more polyunsaturated fatty acids having at least 4 double bonds; (ii) at least one first antioxidant; and (iii) less than about 1000 ppm lecithin. The oil may comprise less than about 750 ppm of a second antioxidant chosen from an ascorbic acid derivative.

32 Claims, 4 Drawing Sheets

Related U.S. Application Data

(60) Provisional application No. 61/554,291, filed on Nov. 1, 2011.

(56) References Cited

U.S. PATENT DOCUMENTS

| | | | |
|---|---|---|---|
| 5,084,289 | A | 1/1992 | Shin et al. |
| 5,230,916 | A | 7/1993 | Chang et al. |
| 5,234,702 | A | 8/1993 | Katz et al. |
| 5,258,179 | A | 11/1993 | Bracco et al. |
| 5,492,938 | A | 2/1996 | Kyle et al. |
| 5,855,944 | A | 1/1999 | Koschinski et al. |
| 5,871,757 | A | 2/1999 | Cloughley et al. |
| 5,928,696 | A | 7/1999 | Best et al. |
| 6,399,803 | B1 | 6/2002 | Corley et al. |
| 6,623,774 | B2 | 9/2003 | Kendrick et al. |
| 6,750,048 | B2 | 6/2004 | Ruecker et al. |
| 2003/0180424 | A1 | 9/2003 | Friedman et al. |
| 2005/0012739 | A1 | 1/2005 | Kamijo |
| 2005/0170479 | A1 | 8/2005 | Kobzeff et al. |
| 2006/0134178 | A1* | 6/2006 | Doisaki ............ A23D 9/00 424/439 |
| 2007/0003686 | A1* | 1/2007 | Fichtali ............ A23D 9/013 426/601 |
| 2007/0004678 | A1 | 1/2007 | Kohn et al. |
| 2007/0032548 | A1 | 2/2007 | Ellis |
| 2007/0099280 | A1 | 5/2007 | Barclay |
| 2007/0141223 | A1 | 6/2007 | Moore et al. |
| 2009/0011012 | A1 | 1/2009 | Baum |
| 2009/0023808 | A1 | 1/2009 | Raman et al. |
| 2009/0117246 | A1 | 5/2009 | Gledhill et al. |
| 2010/0092617 | A1 | 4/2010 | Whittle |
| 2010/0178369 | A1* | 7/2010 | Arledge ............ A23D 9/007 424/766 |
| 2010/0298274 | A1 | 11/2010 | Hughes et al. |

FOREIGN PATENT DOCUMENTS

| | | |
|---|---|---|
| CN | 101252844 A | 8/2008 |
| EP | 0612346 B1 | 6/1995 |
| EP | 1544281 A1 | 6/2005 |
| EP | 1564278 A1 | 8/2005 |
| GB | 2444896 A | 6/2008 |
| JP | 02055785 A2 | 2/1990 |
| JP | 7236418 A2 | 9/1995 |
| JP | 07501355 | 9/1995 |
| JP | 08275728 A2 | 10/1996 |
| JP | 09263784 A2 | 10/1997 |
| JP | 09272892 A2 | 10/1997 |
| JP | 10140178 A2 | 5/1998 |
| JP | 2006193713 A2 | 7/2006 |
| JP | 2009519980 T | 9/2007 |
| JP | 2009500022 T2 | 1/2009 |
| WO | WO1996005278 | 2/1996 |
| WO | WO1998013446 | 4/1998 |
| WO | WO2001051598 A1 | 7/2001 |
| WO | WO2001053512 A1 | 7/2001 |
| WO | WO2001076385 A1 | 10/2001 |
| WO | WO2001076715 A2 | 10/2001 |
| WO | WO2003049832 A1 | 6/2003 |
| WO | WO2003092628 A2 | 11/2003 |
| WO | WO2005040318 | 5/2005 |
| WO | WO2007005725 A2 | 1/2007 |
| WO | WO2008138575 | 11/2008 |
| WO | WO2009006317 A1 | 1/2009 |

OTHER PUBLICATIONS

E. Gruger, "Fatty Acid Composition of Fish Oils". Published on 1967 "Environmental Science". Available online on https://spo.nmfs.noaa.gov/sites/default/files/legacy-pdfs/CIRC276.pdf (Year: 1967).*

Drusch et al., Efficient stabilization of bulk fish oil rich in long-chain polyunsaturated fatty acids, Eur. J. Lipid Sci. Technol., 2008, 351-359, 110.

Henderson, R. James et al., Lipid composition and Biosynthesis in the Marine Dinoflagellate Crypthecodinium Cohnii, Photochemistry, Sep. 23, 1987, pp. 1679-1683, vol. 27, No. 6.

Han et al., Solubilization of Vitamin C in Fish Oil and Synergistic Effect with Vitamin E in Retarding Oxidation, JAOCS, 1991, 740-743, 68(10).

* cited by examiner

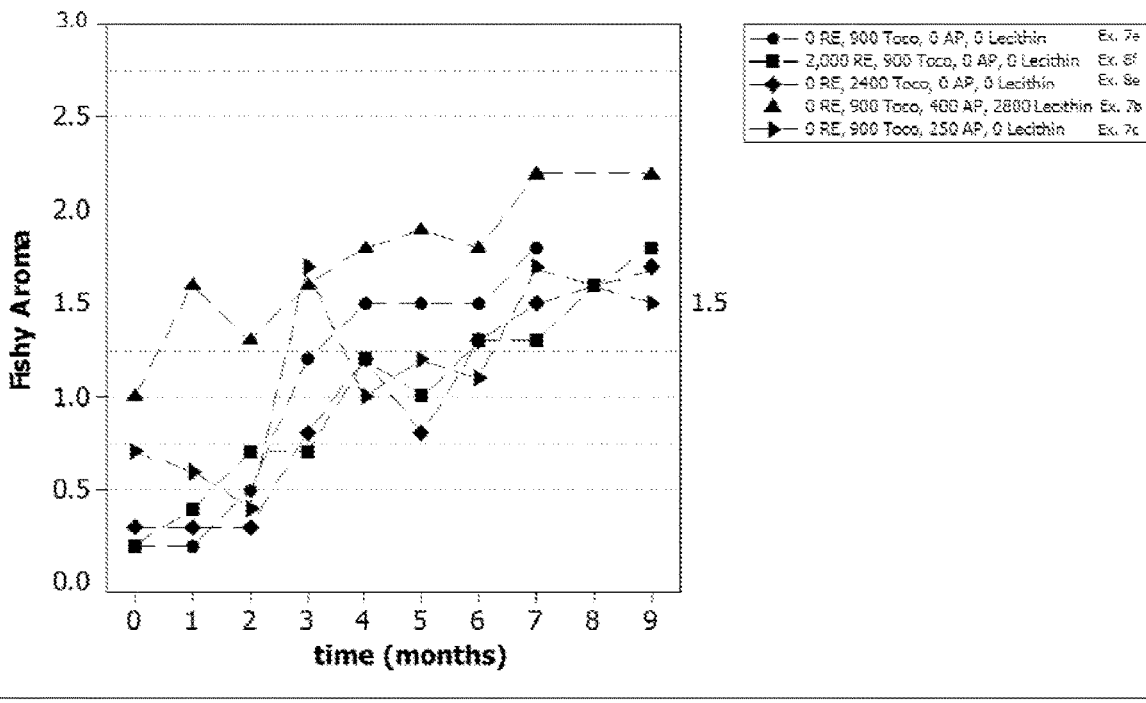
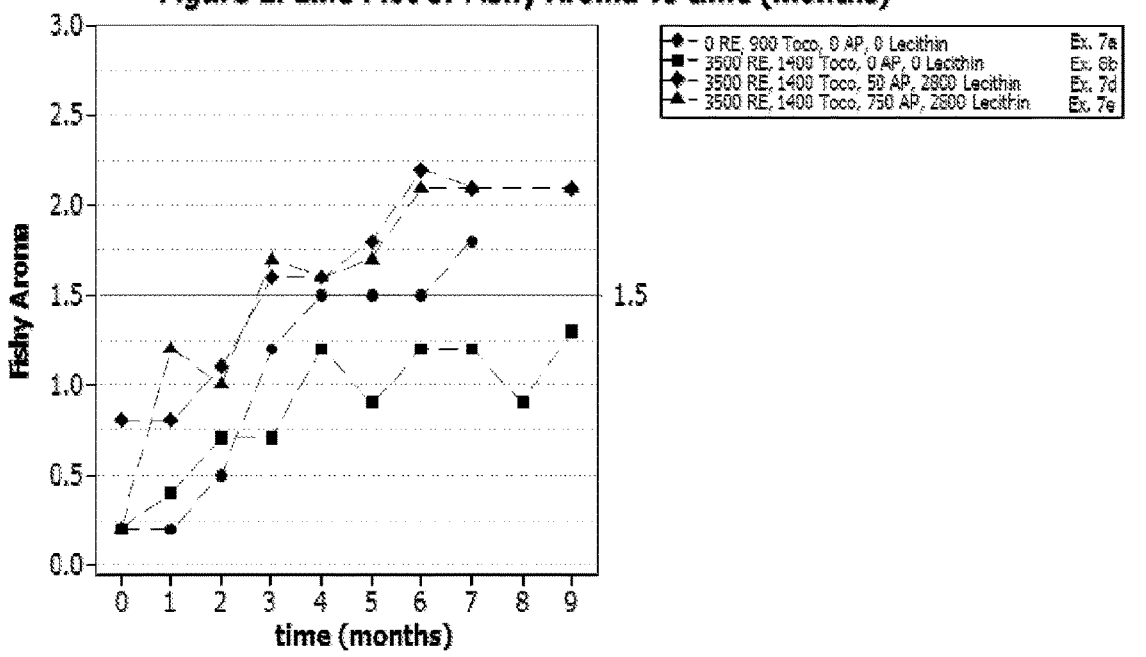

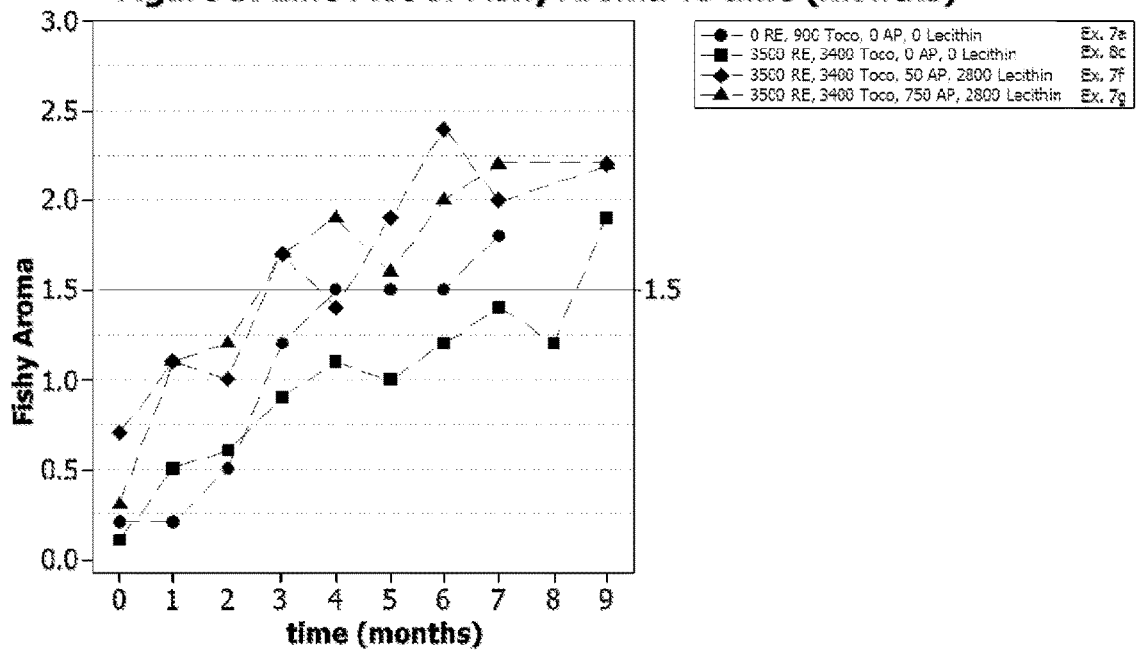
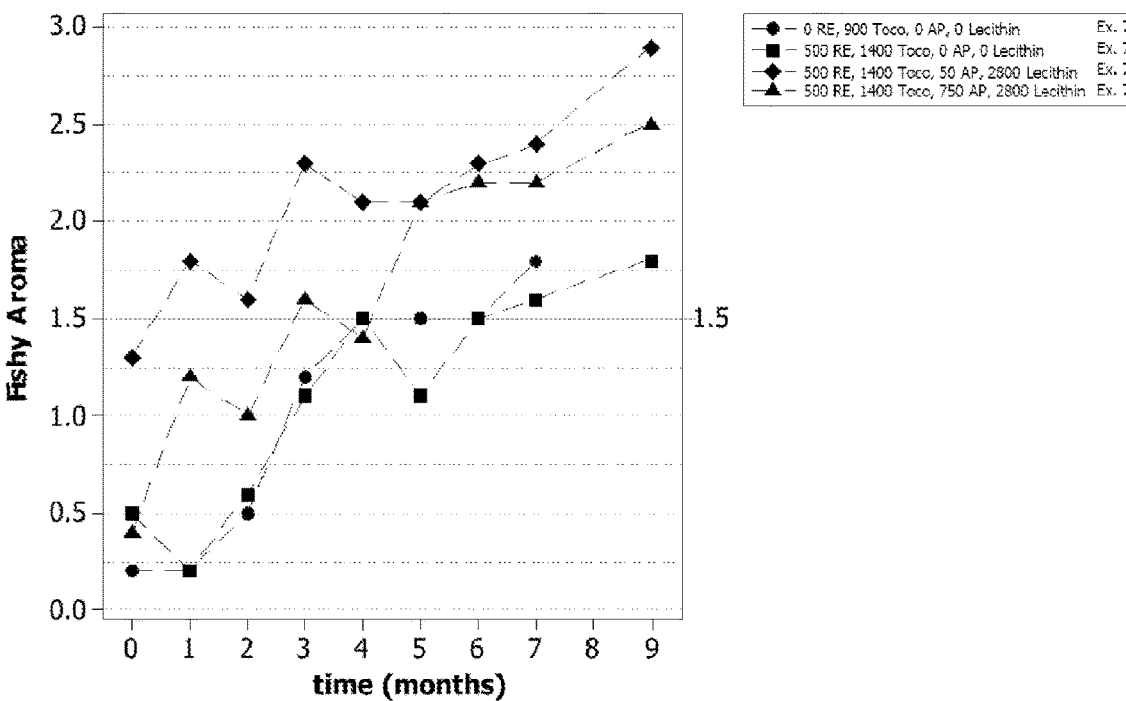

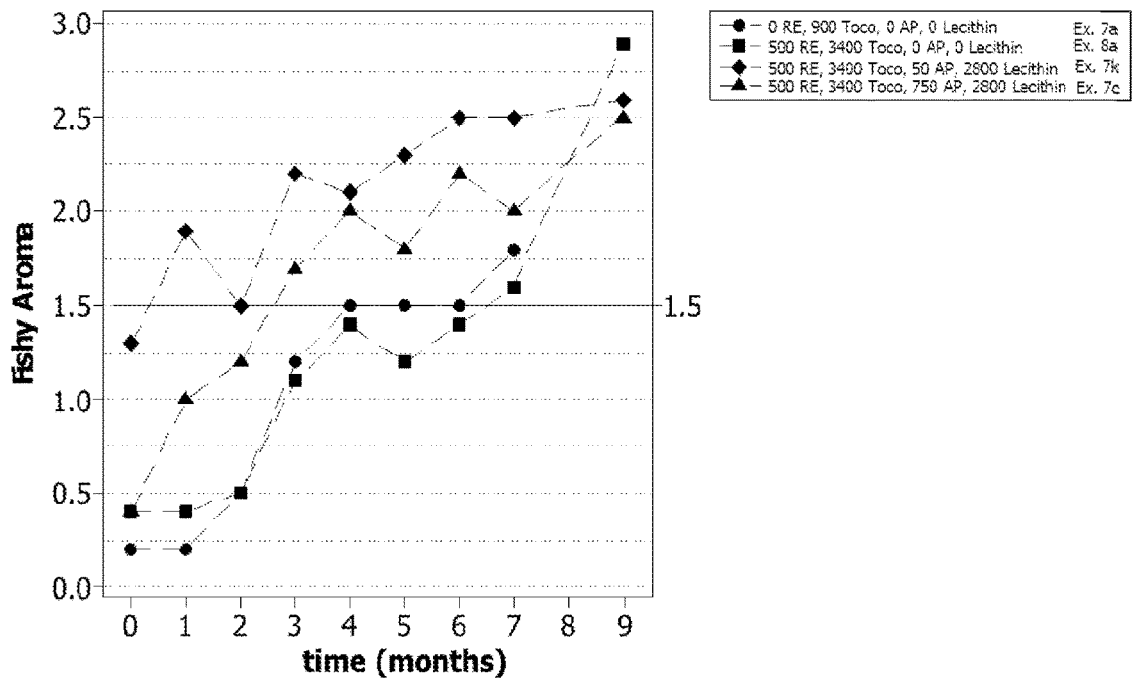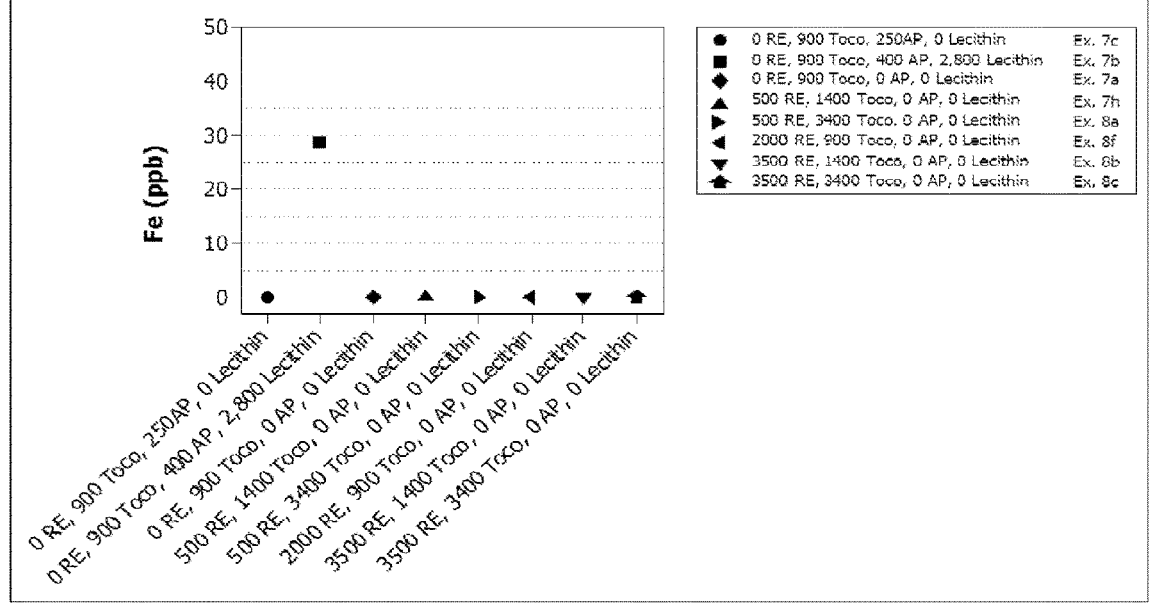

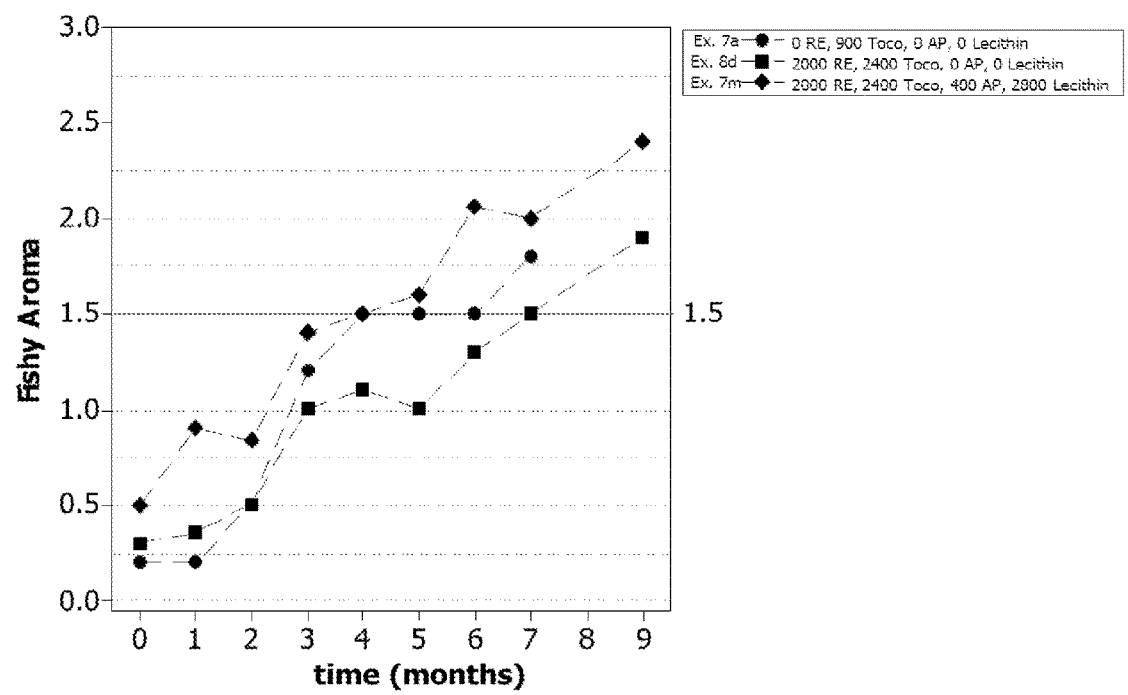

OXIDATIVELY STABLE POLYUNSATURATED FATTY ACID CONTAINING OIL

CROSS-REFERENCE TO RELATED APPLICATIONS

This application is a continuation of U.S. patent application Ser. No. 13/694,134, which claims the benefit of priority under 35 U.S.C. § 119(e) of U.S. Provisional Application No. 61/554,291, filed Nov. 1, 2011, the disclosure of which is incorporated by reference herein in its entirety.

The invention relates to an oil comprising one or more polyunsaturated fatty acids having at least 4 double bonds.

Oils containing polyunsaturated fatty acids (PUFAs) may oxidize and become rancid during storage. This results in unpleasant flavors and odors in the oil as well as in the products in which such oils are incorporated. A PUFA with 4 or more C—C double bonds may be less oxidatively stable than a PUFA with fewer double bonds. Moreover, the presence of metals, such as, iron, may increase the rate at which a PUFA containing oil oxidizes.

Those skilled in the art have attempted to decrease the oxidation of a PUFA containing oil by employing various means including incorporating ascorbic acid derivatives, such as, ascorbyl palmitate in combination with lecithin. There, however, remains a need for more oxidatively stable PUFA containing oils.

It has now been discovered that combining ascorbic acid derivatives, such as, ascorbyl palmitate with lecithin increases the oxidation of an oil comprising 30% of at least one PUFA having 4 or more carbon-carbon double bonds. Accordingly, the following non-limiting embodiments of the present invention are provided herein. The embodiments described herein may be suitably combined or subdivided to yield suitable subcombinations to comprise, consist of or consist essentially of additional embodiments.

BRIEF DESCRIPTION OF THE DRAWINGS

FIG. 1 is a graph depicting the fishy aroma sensory value over time of oils according to examples 7a, 7b, 7c, 8e, and 8f.

FIG. 2 is a graph depicting the fishy aroma sensory value over time of oils according to examples 7a, 7d, 7e, and 8b.

FIG. 3 is a graph depicting the fishy aroma sensory value over time of oils according to examples 7a, 7f, 7g, and 8c.

FIG. 4 is a graph depicting the fishy aroma sensory value over time of oils according to examples 7a, 7h, 7i, and 7j.

FIG. 5 is a graph depicting the fishy aroma sensory value over time of oils according to examples 7a, 7c, 7k, and 8a.

FIG. 6 is a graph depicting the concentration of iron (ppb) contained in oils substantially free of lecithin (examples 7a, 7c, 7h, 8a-c, and 8f) versus an oil containing mixed tocopherol, ascorbyl palmitate, and lecithin (example 7b).

FIG. 7 is a graph depicting the fishy aroma sensory value over time of oils according to examples 7a, 8d, and 7m.

Disclosed herein is an oil comprising (i) at least 30 wt. % of one ore more polyunsaturated fatty acids having at least 4 double bonds; (ii) at least one first antioxidant; and (iii) less than about 1000 ppm lecithin.

Disclosed herein is an oil comprising (i) at least 30 wt. % of one or more polyunsaturated fatty acids having at least 4 double bonds; (ii) at least one first antioxidant; and (iii) less than about 750 ppm of a second antioxidant chosen from an ascorbic acid derivative.

Disclosed herein is an oil comprising (i) at least one polyunsaturated fatty acid having at least 4 double bonds; (ii) at least one first antioxidant; and (iii) less than about 30 ppb iron. Optionally the oil comprises at least 30 wt. % of one or more polyunsaturated fatty acids having at least 4 double bonds.

Disclosed herein is an oil comprising (i) at least about 30 wt. % of one or more polyunsaturated fatty acids having at least 4 carbon-carbon double bonds; (ii) at least one first antioxidant; and (iii) means for improving oxidative stability, wherein said oil has a fishy aroma of less than 1.5.

As used herein wt. % of one or more polyunsaturated fatty acids having at least 4 double bonds is expressed with respect to the sum weight of the total fatty acids in the oil.

As used herein wt. % of one or more polyunsaturated fatty acids refers to the weight percentage of the sum of all polyunsaturated fatty acids having at least 4 double bonds present in the oil.

As used herein wt. % of a specific fatty acid or any combination of specific fatty acids is expressed with respect to the sum weight of the total fatty acids in the oil.

The term "essentially free" when used to describe lecithin means less than or equal to about 150 ppm, about 15 ppm, about 10 ppm, about 5 ppm, about 1 ppm, and about 0 ppm.

The term "essentially free" when used to describe an ascorbic acid derivative means less than or equal to about 3 ppm, to about 2.5 ppm, to about 2 ppm, to about 1.5 ppm, to about 1 ppm, to about 0.5 ppm, to about 0.

The term "free of" when used to describe lecithin or an ascorbic acid derivative means there are no detectable quantities present.

The term "lecithin" when used herein includes, for example, sunflower lecithin, soy lecithin, egg lecithin, and mixtures thereof. In one embodiment, the oil described herein comprises less than about 1200 ppm lecithin, less than about 1000 ppm lecithin, less than 750 ppm lecithin, less than about 500 ppm lecithin, less than about 250 ppm lecithin, or less than about 200 ppm lecithin. In one embodiment, the oil described herein is free of lecithin. In another embodiment, the oil described herein is essentially free of lecithin.

In another embodiment, the oil described herein has an iron content of less than about 30 ppb or more particularly less than or equal to about 25 ppb, 20 ppb, 15 ppb, 10 ppb, 5 ppb, 1 ppb, 0.5 ppb, or 0.2 ppb. In another embodiment, the iron content is 0 ppb.

The term "antioxidant" when used herein includes, for example, ascorbic acid derivatives, tocopherol, green tea extract, and/or mixtures thereof.

In one embodiment, the antioxidant is a first antioxidant chosen from tocopherol, green tea extract, and/or mixtures thereof. In another embodiment, the antioxidant is a second antioxidant chosen from ascorbic acid derivatives.

The term "ascorbic acid derivative" when used herein includes, for example, ascorbic acid, ascorbyl palmitate, ascorbyl stearate, and/or mixtures thereof. In one embodiment, the ascorbic acid derivative is ascorbyl pamitate.

In a further embodiment, the ascorbic acid derivative is present in the oil described herein in an amount ranging from about 0 ppm to about 50 ppm, from about 0 ppm to about 250 ppm, from about 0 ppm to about 300 ppm, from about 0 ppm to about 400 ppm, from about 0 ppm to about 750 ppm, from about 50 ppm to about 250 ppm, from about 50 ppm to about 300 ppm, from about 50 ppm to about 400 ppm, from about 50 ppm to about 750 ppm, from about 250 ppm to about 750 ppm, from about 250 ppm to about 400 ppm, from about 250 ppm to about 300 ppm, from about 300 ppm to about 400 ppm. In yet a further embodiment, the oil described herein comprises less than about 750 ppm ascorbic acid derivative, less than about 400 ppm ascorbic acid derivative, less than about 300 ppm ascorbic acid derivative, less than about 250 ppm ascorbic acid derivative, or less than about 50 ppm ascorbic acid derivative. In a still further embodiment, the oil described herein is essentially free of an ascorbic acid derivative. In another embodiment, the oil described herein is essentially free of ascorbyl palmitate. In a further embodiment, the oil described herein comprises about 250 ppm ascorbic acid derivative. In another embodiment, the oil described herein comprises about 250 ppm ascorbyl palmitate. In another embodiment, the oil described herein is free of ascorbic acid derivative. In a further embodiment, the oil is free of ascorbyl palmitate.

In one embodiment, the oil described herein is essentially free of an ascorbic acid derivative and essentially free of lecithin. In a further embodiment, the oil described herein is essentially free of ascorbyl palmitate and essentially free of lecithin. In another embodiment, the oil is free of an ascorbic acid derivative and free of lecithin. In yet another embodiment, the oil is free of ascorbyl palmitate and free of lecithin.

In yet another embodiment, the at least one first antioxidant is a tocopherol. In another embodiment, the at least one first antioxidant is an addition tocopherol. In a still a further embodiment, the at least one first antioxidant is a mixed tocopherol. In another embodiment, the at least one first antioxidant is dl-α-tocopherol, d-α-tocopherol, β-tocopherol, γ-tocopherol, δ-tocopherol, α-tocotrienol, β-tocotrienol, γ-tocotrienol and δ-tocotrienol, or a mixture thereof.

In another embodiment, by the term "tocopherol", there is meant any isomer of tocopherol (or mixture thereof), including but not limited to dl-α-tocopherol (i.e., synthetic tocopherol), d-α-tocopherol (i.e., natural tocopherol), β-, γ-, and δ-tocopherol dl-α-tocopherol, and α-tocotrienol, β-tocotrienol, γ-tocotrienol and δ-tocotrienol.

In one embodiment, the oil described herein may comprise tocopherol in an amount ranging from about 900 ppm to about 3400 ppm, from about 900 ppm to about 2400 ppm, from about 900 ppm to about 2000 ppm, from about 900 ppm to about 1700 ppm, from about 900 ppm to about 1400 ppm, from about 1400 ppm to about 3400 ppm, from about 1400 ppm to about 2400 ppm, from about 1400 ppm to about 2000 ppm, from about 1400 ppm to about 1700 ppm, from about 1700 ppm to about 3400 ppm, from about 1700 ppm to about 2400 ppm, from about 1700 ppm to about 2000 ppm, from about 2000 ppm to about 3400 ppm, from about 2000 ppm to about 2400 ppm, or from about 2400 ppm to about 3400 ppm. In a further embodiment, the oil described herein comprises less than about 3400 ppm tocopherol, less than about 2400 ppm tocopherol, less than about 2000 ppm tocopherol, less than about 1700 ppm tocopherol, less than about 1400 ppm tocopherol, or less than about 900 ppm tocopherol. In a still further embodiment, the oil described herein comprises at least about 900 ppm tocopherol, at least about 1400 ppm tocopherol, at least about 1700 ppm tocopherol, at least about 2000 ppm tocopherol, at least about 2400 ppm tocopherol, or at least about 3400 ppm tocopherol. In one embodiment, the oil described herein comprises about 1400 ppm tocopherol, about 1700 ppm tocopherol, or about 2400 ppm tocopherol.

The term "addition tocopherol" when used herein includes isomers and derivatives of tocopherol that are added to an oil described herein. Addition tocopherols, include, for example, α-tocopherol, dl-α-tocopherol, d-α-tocopherol, β-tocopherol, γ-tocopherol, δ-tocopherol, α-tocotrienol, β-tocotrienol, γ-tocotrienol, δ-tocotrienol, D-α-tocopherol, D-β-tocopherol, D-γ-tocopherol, D-δ-tocopherol, and/or mixtures thereof.

In a further embodiment, the oil described herein may comprise an addition tocopherol ranging from about 0 ppm to about 2500 ppm, from about 0 ppm to about 1500 ppm, from about 0 ppm to about 900 ppm from about 0 ppm to about 800 ppm, from about 0 ppm to about 500 ppm, from about 50 ppm to about 5000 ppm, from about 500 ppm to about 3500 ppm, from about 500 ppm to about 2500 ppm, from about 500 ppm to about 1500 ppm, from about 500 ppm to about 900 ppm, from about 500 ppm to about 800 ppm, from about 300 ppm to about 700 ppm, from about 800 ppm to about 2500 ppm, from about 800 ppm to about 1500 ppm, from about 800 ppm to about 900 ppm, from about 900 ppm to about 2500 ppm, from about 900 ppm to about 1500 ppm, or from about 1500 ppm to about 2500 ppm. In yet another embodiment, the oil described herein comprises less than about 2500 ppm addition tocopherol, less than about 1500 ppm addition tocopherol, less than about 900 ppm addition tocopherol, less than about 800 ppm addition tocopherol, or less than about 500 ppm addition tocopherol. In another embodiment, the oil described herein comprises about 500 ppm addition tocopherol, about 800 ppm addition tocopherol, or about 1500 ppm addition tocopherol.

In one embodiment, the tocopherol is chosen from α-tocopherol, dl-α-tocopherol, d-α-tocopherol, β-tocopherol, γ-tocopherol, δ-tocopherol, α-tocotrienol, β-tocotrienol, γ-tocotrienol, δ-tocotrienol, D-α-tocopherol, D-β-tocopherol, D-γ-tocopherol, D-δ-tocopherol, and/or mixtures thereof.

The term "mixed tocopherol" when used herein includes mixtures of isomers and derivatives of addition tocopherols, including, for example, mixtures of dl-α-tocopherol, d-α-tocopherol, β-tocopherol, γ-tocopherol, δ-tocopherol, α-tocotrienol, β-tocotrienol, γ-tocotrienol, δ-tocotrienol, D-α-tocopherol, D-β-tocopherol, D-γ-tocopherol, and D-δ-tocopherol.

In one embodiment, the mixed tocopherol is a mixture of D-α-tocopherol, D-β-tocopherol, D-γ-tocopherol, and D-δ-tocopherol. In another embodiment, the mixed tocopherol is a mixture of from about 9 to about 20% D-α-tocopherol, from about 1 to about 4% D-β-tocopherol, from about 50 to about 65% D-γ-tocopherol, and from about 20 to about 35% D-δ-tocopherol. In yet another embodiment, the mixed tocopherol is a natural mixed tocopherol.

In one embodiment, the oil described herein comprises mixed tocopherol in an amount ranging from about 900 ppm to about 3400 ppm, from about 900 ppm to about 2400 ppm, from about 900 ppm to about 2000 ppm, from about 900 ppm to about 1700 ppm, from about 900 ppm to about 1400 ppm, from about 1400 ppm to about 3400 ppm, from about 1400 ppm to about 2400 ppm, from about 1400 ppm to about 2000 ppm, from about 1400 ppm to about 1700 ppm, from about 1700 ppm to about 3400 ppm, from about 1700 ppm to about 2400 ppm, from about 1700 ppm to about 2000 ppm, from about 2000 ppm to about 3400 ppm, from about 2000 ppm to about 2400 ppm, or from about 2400 ppm to about 3400 ppm. In a further embodiment, the oil described herein comprises less than about 3400 ppm mixed tocopherol, less than about 2400 ppm mixed tocopherol, less than about 2000 ppm mixed tocopherol, less than about 1700 ppm mixed tocopherol, less than about 1400 ppm mixed tocopherol, or less than about 900 ppm mixed tocopherol. In one embodiment, the oil described herein comprises about 1400 ppm mixed tocopherol, about 1700 ppm mixed tocopherol, or about 2400 ppm mixed tocopherol.

The oils described herein may further contain natural tocopherols, in the form of, for example, tocotrienols that the microorganism produces during fermentation and which is ultimately contained in the crude oil. The amount of natural tocopherols contained in the crude oil can range from, for example, about 25 ppm to about 500 ppm tocotrienols.

The term "green tea extract" includes, for example, green tea extracts containing, for example, polyphenolic compounds (i.e., catechins). Examples of polyphenolic compounds that can be present in green tea extracts include epigallocatechin gallate 25 (EGCG), epigallocatechin (EGC), epicatechin gallate (ECG), epicatechin (EC), and mixture thereof. In one embodiment, the green tea extract contains at least one polyphenolic compound in an amount of from about 1% to about 90%, from about 5% to about 85%, from about 10% to about 80%, from about 15% to about 75%, from about 20% to about 70%, from about 25% to about 65%, from about 30% to about 60%, from about 35% to about 55%, or from about 40% to about 50% by weight of the green tea extract, exclusive of any carriers.

The term "flavoring reagent" includes, for example, rosemary extract and vanilla. The rosemary extract may be extracted from, for example, *Rosmarinus officinalis*. The rosemary extract may, for example, be organic. The rosemary extract may be obtained by drying leaves of rosemary, which belongs to the Perilla family, pulverizing the dried leaves, and subjecting the resultant pulverized material to extraction with water, hot water, hexane, ethanol, acetone, ethyl acetate, or a mixture of any of these solvents. Examples of components found in rosemary extract include caffeic acid, carnosol, carnosic acid, methoxy carnosic acid, rosmarinic acid, rosmanol, rosmaridiphenol, rosmaridiquinone, and/or mixtures thereof. Numerous rosemary extracts are also available commercially, and any one or more can be used in the present invention. Suitable rosemary extracts are commercially available from, for example, Kalsec (Kalamazoo, MI, USA) under the trade name of Herbalox®; Vitiva (Markovci, Slovenia) under the trade name Inolens®; Naturex (Avignon, France) under the trade name StabileEnhance®; and Ecom Food Industries Corporation (Ontario, Canada) under the product code NR 3401.

In one embodiment, the flavoring reagent is rosemary extract. In another embodiment, the rosemary extract is extracted from *Rosmarinus officinalis*.

In yet another embodiment, the oil described herein may comprise rosemary extract in an amount ranging from about 0 ppm to about 5000 ppm, from about 0 ppm to about 3500 ppm, from about 0 ppm to about 3000 ppm, from about 0 ppm to about 2000 ppm, from about 0 ppm to about 750 ppm, from about 0 ppm to about 500 ppm, from about 50 ppm to about 5000 ppm, from 50 ppm to about 7,500 ppm, from about 50 ppm to about 10,000 ppm, from about 500 ppm to about 5000 ppm, from about 500 ppm to about 4000 ppm, from about 500 to about 3500 ppm, from about 500 ppm to about 3000 ppm, from about 500 ppm to about 2000 ppm, from about 500 ppm to about 750 ppm, from about 750 ppm to about 5000 ppm, from about 750 ppm to about 3500 ppm, from about 750 ppm to about 3000 ppm, from about 750 ppm to about 2000 ppm, from about 2000 ppm to about 5000 ppm, from about 2000 ppm to about 3500 ppm, from about 2000 ppm to 3000 ppm, from about 3000 ppm to about 3500 ppm, from about 3500 ppm to about 5000 ppm. In still another embodiment, the oil described herein comprises less than about 5000 ppm rosemary extract, less than about 3500 ppm rosemary extract, less than about 3000 ppm rosemary extract, less than about 200 ppm rosemary extract, less than about 750 ppm rosemary extract, or less than about 500 ppm rosemary extract. In yet still another embodiment, the oil described herein comprises about 5000 ppm rosemary extract, about 3500 ppm rosemary extract, about 3000 ppm rosemary extract, or about 2000 ppm rosemary extract.

In one embodiment, the oil described herein may comprise about 3000 ppm rosemary extract, about 1700 mixed tocopherol, and about 250 ppm ascorbyl palmitate, with the proviso that the oil is essentially free of lecithin. In another embodiment, the oil described herein may comprise about 3000 ppm rosemary extract, about 800 ppm addition tocopherol, and about 250 ppm ascorbyl palmitate, with the proviso that the oil is essentially free of lecithin. In yet another embodiment, the oil described herein may comprise about 3500 ppm rosemary extract and about 1400 ppm mixed tocopherol, with the proviso that the oil is essentially free of lecithin and ascorbyl palmitate. In still a further embodiment, the oil described herein may comprise about 3500 ppm rosemary extract and about 500 ppm addition tocopherol, with the proviso that the oil is essentially free of lecithin and ascorbyl palmitate. In yet still a further embodiment, the oil described herein may comprise about 2000 ppm rosemary extract and about 2400 ppm mixed tocopherol, with the proviso that the oil is essentially free of lecithin and ascorbyl palmitate. In another embodiment, the oil described herein may comprise about 2000 ppm rosemary extract and about 1500 ppm addition tocopherol, with the proviso that the oil is essentially free of lecithin and ascorbyl palmitate. In a further embodiment, the oil described herein may comprise about 5000 ppm rosemary extract, about 1700 mixed tocopherol, and about 250 ppm ascorbyl palmitate, with the proviso that the oil is essentially free of lecithin. In an even further embodiment, the oil described herein may comprise about 5000 ppm rosemary extract, about 800 ppm addition tocopherol, and about 250 ppm ascorbyl palmitate, with the proviso that the oil is essentially free of lecithin.

In one embodiment, the oil described herein may comprise about 3000 ppm rosemary extract, about 1700 mixed tocopherol, and about 250 ppm ascorbyl palmitate, with the proviso that the oil is free of lecithin. In another embodiment, the oil described herein may comprise about 3000 ppm rosemary extract, about 800 ppm addition tocopherol, and about 250 ppm ascorbyl palmitate, with the proviso that the oil is free of lecithin. In yet another embodiment, the oil described herein may comprise about 3500 ppm rosemary extract and about 1400 ppm mixed tocopherol, with the proviso that the oil is free of lecithin and ascorbyl palmitate. In still a further embodiment, the oil described herein may comprise about 3500 ppm rosemary extract and about 500 ppm addition tocopherol, with the proviso that the oil is free of lecithin and ascorbyl palmitate. In yet still a further embodiment, the oil described herein may comprise about 2000 ppm rosemary extract and about 2400 ppm mixed tocopherol, with the proviso that the oil is free of lecithin and ascorbyl palmitate. In another embodiment, the oil described herein may comprise about 2000 ppm rosemary extract and about 1500 ppm addition tocopherol, with the proviso that the oil is free of lecithin and ascorbyl palmitate. In a further embodiment, the oil described herein may comprise about 5000 ppm rosemary extract, about 1700 mixed tocopherol, and about 250 ppm ascorbyl palmitate, with the proviso that the oil is free of lecithin. In an even further embodiment, the oil described herein may comprise about 5000 ppm rosemary extract, about 800 ppm addition tocopherol, and about 250 ppm ascorbyl palmitate, with the proviso that the oil is free of lecithin.

One embodiment is directed to an oil comprising at least about 30%, by weight of fatty acid content in the oil, of at least one polyunsaturated fatty acid having at least 4 carbon-carbon double bonds; at least one first antioxidant; and means for improving oxidative stability.

The p-Anisidine value (p-AV) is determined in accordance with AOCS Official Method Cd 18-90. In one embodiment, the oil described herein has a p-AV of less than about 40; less than about 30; or less than about 20.

The peroxide value (PV) is determined in accordance with the AOCS Official Method Cd 8-53. In one embodiment, the oil described herein has a PV less than about 20 meq/kg; less than about 10 meq/kg; or less than about 5 meq/kg.

The Rancimat values are determined by the standard test for oil stability, using a rancimat apparatus operated at 90° C., with airflow set at 10 L/hour (AOCS Cd 12b-92). In one embodiment, the oil described herein has a RANCIMAT value of less than or equal to about 3, to about 4, about 5, about 6, about 7, about 8, about 9, about 10, about 11, about 12, about 13, about 14, about 15, about 16, about 17, about 18, about 19 at suitable storage. In one embodiment, rancimat value is determined after about 3 months, about 5 months, about 6 months, about 7 months, or 8 months of suitable storage. A person of skill in the understand would understand at what conditions to store the oils described herein. In one embodiment, the oil described herein is stored at room temperature (25° C.) in Nylon/Foil/PE Low Density Polyethylene bags packaged with vacuum then heat sealed under $N_2$ (Heritage Packaging) or epoxy-phenolic lined aluminium containers (Elemental Container Inc.)

The marine/fishy aroma (smell) and marine/fishy aromatics (taste) sensory values were determined according to the method as described in Sensory Evaluation Techniques. Meilgaard et al., *CRC Press;* 4 edition (Dec. 13, 2006). A panel of 8-18 experienced people taste (or smell) a sample. Each of these people determine the value of the sample. Afterwards all the values are averages arithmetically and the result is rounded up or down to the next number. A value of ≥1.5 fishy/marine aroma and ≥2.5 fishy/marine aromatics is expected to be perceivable by the general population.

In one embodiment, the oil described herein has a fishy aroma sensory value of less than 1.5 after about 3 months, after about 4 months, after about 5 months, after about 6 months, after about 7 months, after about 8 months, or after about 9 months of suitable storage. In another embodiment, the oil described herein has a fishy aroma value of less than 1.5 at a time period chosen from 0-3 months, at 0-4 months, at 0-5 months, at 0-6 months, at 0-7 months, at 0-8 months, or at 0-9 months. In one embodiment, the suitable storage is performed at room temperature (25° C.) in Nylon/Foil/PE Low Density Polyethylene bags packaged with vacuum then heat sealed under $N_2$ or epoxy-phenolic lined aluminium containers.

In one embodiment, the oil described herein has a fishy aromatics sensory value of less than 2.5 after about 3 months, after about 4 months, after about 5 months, after about 6 months, after about 7 months, after about 8 months, or after about 9 months of suitable storage. In another embodiment, the oil described herein has a fishy aroma value of less than 1.5 at a time period chosen from 0-3 months, at 0-4 months, at 0-5 months, at 0-6 months, at 0-7 months, at 0-8 months, or at 0-9 months. In one embodiment, the suitable storage is performed at room temperature (25° C.) in Nylon/Foil/PE Low Density Polyethylene bags packaged with vacuum then heat sealed under $N_2$ or epoxy-phenolic lined aluminium containers.

In one embodiment, the at least one $C_{18-22}$ PUFA having 4 carbon-carbon double bonds is chosen from docasoahexaenoic acid ("DHA"), eicosapentaenoic acid ("EPA"), arachidonic acid ("ARA"), omega-3 docosapentaenoic acid ("DPA n-3"), and omega-6 docosapentaenoic acid ("DPA n-6"). In some embodiments, the oil comprises omega-3 PUFAs. In further embodiments, the omega-3 PUFAs are chosen from DHA, EPA, DPAn-3, and mixtures thereof.

In some of embodiments the oil is characterized by at least one of the following fatty acids (or esters thereof), expressed as wt % of the total fatty acid content of the oil. The embodiments described herein may further comprise about 3% or less of other fatty acids or esters thereof.

In one embodiment, the oil described herein comprises at least about 30 wt. %, at least about 35 wt. %, at least about 40 wt. %, at least about 45 wt. %, or at least about 50 wt. % of one or more polyunsaturated fatty acids having at least 4 double bonds. In another embodiment, the oil described herein comprises from about 30 wt. % to about 60 wt. %, from about 30 wt. % to about 50 wt. %, from about 30 wt. % to about 40 wt. %, from about 40 wt. % to about 60 wt. %, or from about 40 wt. % to about 50 wt. % of one or more polyunsaturated fatty acid having at least 4 double bonds.

In one embodiment, the oil described herein comprises at least about 30 wt. %, at least about 35 wt. %, at least about 40 wt. %, at least about 45 wt. %, or at least about 50 wt. % of DHA. In another embodiment, the oil described herein comprises from about 30 wt. % to about 60 wt. %, from about 30 wt. % to about 50 wt. %, from about 30 wt. % to about 40 wt. %, from about 40 wt. % to about 60 wt. %, or from about 40 wt. % to about 50 wt. % of DHA.

In one embodiment, the oil described herein comprises at least about 35 wt. % of DHA+EPA, at least about 40 wt. %, at least about 45 wt. %, at least about 50 wt. % of DHA+EPA, wherein said oil comprises less than about 80 wt. %, less than about 70 wt. %, or less than about 60 wt. % of DHA+EPA.

In one embodiment, the oil described herein comprises at least about 30%, at least about 35%, at least about 40%, at least about 45%, or at least about 50%, by weight of the total fatty acid content of the oil, of at least one polyunsaturated fatty acid having at least 4 double bonds. In another embodiment, the oil described herein comprises from about 30% to about 60%, from about 30% to about 50%, from about 30% to about 40%, from about 40% to about 60%, or from about 40% to about 50%, by weight of the total fatty acid content of the oil, of at least one polyunsaturated fatty acid having at least 4 double bonds.

In one embodiment, the oil described herein comprises at least about 30%, at least about 35%, at least about 40%, at least about 45%, or at least about 50%, by weight of the total fatty acid content of the oil, of DHA. In another embodiment, the oil described herein comprises from about 30% to about 60%, from about 30% to about 50%, from about 30% to about 40%, from about 40% to about 60%, or from about 40% to about 50%, by weight of the total fatty acid content of the oil, of DHA.

In another embodiment, the oil comprises less than about 80%, less than about 70%, or less than about 60%, by weight totally fatty acid, of at least one $C_{18-22}$ PUFA having 4 carbon-carbon double bonds.

The potency of DHA and EPA is determined in accordance with AOCS Official Method Ce 1b-89. In one embodiment, the oil described herein comprises from about 200 mg DHA/g oil, from about 300 mg DHA/g oil, from about 350 mg DHA/g oil, from about 400 mg DHA/g oil, or from about 500 mg DHA/g oil. In another embodiment, the oil described herein comprises from about 120 mg EPA/g oil or from about 130 mg EPA/g oil. In still a further embodiment, the oil described herein comprises from about 200 mg DHA/g oil to about 600 mg DHA/g oil, from about 200 mg DHA/g oil to about 500 mg DHA/g oil, from about 200 mg DHA/g oil to about 400 mg DHA/g oil, from about 300 mg DHA/g oil to about 600 mg DHA/g oil, from about 300 mg DHA/g oil to about 500 mg DHA/g oil, or from about 300 mg DHA/g oil to about 400 mg DHA/g oil. In a still further embodiment, the oil described herein comprises from about 100 mg EPA/g oil to about 250 mg EPA/g oil. In a further embodiment, the oil described herein comprises from about 400 mg DHA+EPA/g oil or from about 500 mg DHA+EPA/g oil.

In one embodiment, the oil described herein may comprise about 2% or less of ARA, by weight of the total fatty acid content of the oil. In a further embodiment, the oil described herein comprises about 3% or less of EPA, by weight of the total fatty acid content of the oil. In a still further embodiment, the oil described herein comprise about 18% or less or about 12% to about 18%, by weight of the total fatty acid content of the oil, of DPA n-6. In yet an even further embodiment, the oil described herein may comprise about 10% or less, by weight of the total fatty acid content of the oil, of other fatty acids.

In some embodiments, the oil is substantially free of EPA. As used herein, the term "substantially free of EPA" may refer to an oil in which EPA is less than about 3%, by weight of the total fatty acid content of the oil. In some embodiments, the oil comprises, less than about 2% EPA by weight of the total fatty acid content of the oil, less than about 1% EPA by weight of the total fatty acid content of the oil, less than about 0.5% EPA by weight of the total fatty acid content of the oil, less than about 0.2% EPA by weight of the total fatty acid content of the oil, or less than about 0.01% EPA by weight of the total fatty acid content of the oil. In some embodiments, the oil has no detectable amount of EPA using techniques known in the art. In some embodiments, the oil has no EPA.

In some embodiments, the oil can also be substantially free of ARA. In some embodiments, the ARA is less than about 3% by weight of the total fatty acid content of the oil. In some embodiments, ARA comprises less than about 2% by weight of the total fatty acid content of the oil, less than about 1% by weight of the total fatty acid content of the oil, less than about 0.5% by weight of the total fatty acid content of the oil, less than about 0.2% by weight of the total fatty acid content of the oil, or less than about 0.01% by weight of the total fatty acid content of the oil. In some embodiments, the oil has no detectable amount of ARA.

In one embodiment, the oil described herein may comprise about 2 wt. % or less of ARA. In a further embodiment, the oil described herein comprises about 3 wt. % or less of EPA. In a still further embodiment, the oil described herein comprise about 18 wt. % or less or about 12 wt. % to about 18 wt. % of DPA n-6. In yet an even further embodiment, the oil described herein may comprise about 10 wt. % or less of other fatty acids.

In some embodiments, the oil is substantially free of EPA. As used herein, the term "substantially free of EPA" may refer to an oil in which EPA is less than about 3 wt. %. In some embodiments, the oil comprises, less than about 2 wt. % EPA less than about 1 wt. % EPA, less than about 0.5 wt. % EPA, less than about 0.2 wt. % EPA, or less than about 0.01 wt. % EPA. In some embodiments, the oil has no detectable amount of EPA using techniques known in the art. In some embodiments, the oil has no EPA.

In some embodiments, the oil can also be substantially free of ARA. In some embodiments, the oil comprises less than about 3 wt. % ARA. In some embodiments, the oil comprises less than 2 wt. % ARA, less than about 1 wt. %, less than about 0.5 wt. %, less than about 0.2 wt. %, or less than about 0.01 wt. % ARA. In some embodiments, the oil has no detectable amount of ARA.

The oil describe herein can be used in any application, where such oils are needed. The oil can be used in, for example, food products (including beverages and dietary supplements), animal feed, and/or personal care products. These products can be in, for example, any form, such as, a liquid, emulsion, gel, and/or solid. These products can be ready to use (ready to consume) products as well as products which need to be further processed (for example by dilution, dissolving, heating, etc). In one embodiment, the oil disclosed herein is an edible oil. In another embodiment, the oil disclosed herein is an edible oil that is used in food products. Exemplary food products, include, but are not limited to nutritional bars, dietary supplements, granola bars, baked goods (e.g., breads, rolls, cookies, crackers, fruit pies, or cakes), pastas, condiments, salad dressings, soup mixes, snack foods, processed fruit juices, sauces, gravies, syrups, beverages, dry beverage powders, and jams or jellies.

In a further embodiment, the oil described herein is organic. The term "organic" as used herein includes, for example, the standards set by the U.S. Department of Agriculture (USDA) and the European Union (EU) for including this term in food product labeling. The EU standards are set forth, for example, in Regulation EC 834/2007, and in the US the USDA standards are set forth, for example, in the National Organic Program Regulation at 7 C.F.R., Part 205.

In a still further embodiment, the oil described here is natural. The term "natural" as used herein includes, for example, using this term in food product labeling associated with food products that do not contain added color, artificial flavors, or synthetic substances.

The at least one $C_{18-22}$ PUFA having 4 carbon-carbon double bonds can be obtained from various sources including, for example, aquatic animals, such as, fish, marine mammals, and crustaceans (such as krill and other euphausids); animal sources including, for example, animal tissues that include for example brain, liver, and eyes and animal products that include, for example, eggs and milk; microalgae; plant; and/or seed. In one embodiment, the oil is obtained from fish, microalgae, plant or seed.

In one embodiment, the at least one $C_{18-22}$ PUFA having 4 carbon-carbon double bonds is obtained from microalgae. In another embodiment, the microalgae is from the order Thraustochytriales. The order Thraustochytriales, includes, for example, the genera *Thraustochytrium* (species include *arudimentale, aureum, benthicola, globosum, kinnei, motivum, multirudimentale, pachydermum, proliferum, roseum, striatum*), the genera *Schizochytrium* (species include *aggregatum, limnaceum, mangrovei, minutum, octosporum*), the genera *Ulkenia* (species include *amoeboidea, kerguelensis, minuta, profunda, radiate, sailens, sarkariana, schizochytrops, visurgensis, yorkensis*), the genera *Aurantiacochytrium*; the genera *Oblongichytrium*, the genera *Sicyoidochytium*, the genera *Parientichytrium*, the genera *Botryochytrium*, and combinations thereof. For the purposes of this invention, species described within *Ulkenia* will be considered to be members of the genus *Schizochytrium*. In yet another embodiment the microalgae is *Thraustochytrium* sp. In yet a further embodiment the microalgae is *Schizochytrium* sp. In a still further embodiment, the microalgae is chosen from *Thraustochytrium* sp. and *Schizochytrium* sp.

In another embodiment, the at least one $C_{18-22}$ PUFA having 4 carbon-carbon double bonds is obtained from plants, grown either in culture fermentation or in crop plants, including, for example, cereals (such as maize, barley, wheat, rice, sorghum, pearl millet, corn, rye and oats); beans; soybeans; peppers; lettuce; peas; *Brassica* species, such as, cabbage, broccoli, cauliflower, brussel sprouts, rapeseed, and radish; carrot; beets; eggplant; spinach; cucumber; squash; melons; cantaloupe; sunflowers; safflower; canola; flax; peanut; mustard; rapeseed; chickpea; lentil; white clover; olive; palm; borage; evening primrose; linseed; and tobacco.

In one embodiment the oil described herein is a crude oil. In another embodiment, the oil described herein is a refined oil. In yet a further embodiment, the oil described herein is a final oil. A "crude oil" is an oil that is extracted from the biomass of a microorganism without further processing. A "refined oil" is an oil that is obtained by treating a crude oil with standard processing of refining, bleaching, and/or deodorizing. See, e.g., U.S. Pat. No. 5,130,242. A "final oil" is a refined oil that is further blended with a vegetable oil. In some embodiments, a final oil is a refined oil that has been blended with a vegetable oil chosen from medium chain triglycerides (MCTs), canola oil, palm oil, and sunflower oil. In some embodiments the sunflower oil is high oleic sunflower oil. In other embodiments the sunflower oil is organic. In yet other embodiments the high oleic sunflower oil is organic.

One embodiment is directed to a method for improving the oxidative stability of an oil, comprising adding an effective amount of at least one first antioxidant to an oil comprising at least 30%, by weight of fatty acid content in the oil, of at least one polyunsaturated fatty acid having at least 4 double bonds.

The microbial oils described herein can be recovered from microalgae by any suitable means known to those in the art. For example, the oils can be recovered by extracting with techniques, such as those described in, for example, International Pub. Nos. WO 2001/053512, WO 2001/051598, WO 2001/076715, and WO 2001/076385; U.S. Pub. Nos. 2007/0004678 and 2005/012739; and U.S. Pat. No. 6,399,803. Processes for the enzyme treatment of biomass for the recovery of lipids are disclosed in International Pub. No. WO 2003/09628; U.S. Pub. No. 2005/0170479; EP Pat. Pub. 0776356 and U.S. Pat. No. 5,928,696.

In some embodiments, the oil described herein is obtained via the following steps: generating biomass by fermenting microalgae capable of producing oil that contains at least one $C_{18-22}$ PUFA having 4 carbon-carbon double bonds; harvesting the biomass; spray drying the biomass; extracting oil from the biomass; refining the oil (to remove free fatty acids and phospholipids); bleaching the oil (to remove any remaining polar compounds and pro-oxidant metals, and to break down lipid oxidation products); chill filtering the oil (to remove any remaining insoluble fats, waxes, and solids); deodorizing the oil (optionally under vacuum and in, for example, a packed column, counter current steam stripping deodorizer); adding an antioxidant to the oil; and any combinations thereof. In some embodiments, following a controlled growth over a pre-established period, the culture is harvested by centrifugation then pasteurized and spray dried. In certain embodiments, the dried biomass is flushed with nitrogen and packaged before being stored frozen at −20° C. In certain embodiments, the oil is extracted from the dried biomass by mixing the biomass with n-hexane or isohexane in a batch process which disrupts the cells and allows the oil and cellular debris to be separated. In certain embodiments, the solvent is then removed. In one embodiment, the oil described herein is stored at room temperature (25° C.) in Nylon/Foil/PE Low Density Polyethylene bags packaged with vacuum then heat sealed under $N_2$ on a Model AGV Multivac. (Multivac Sepp Haggenmüller GmbH & Co. KG). In another embodiment the oils described herein are stored at room temperature (25° C.) in epoxy-phenolic lined aluminium containers.

Depending on the final use of the oil described herein, the oil can comprise further ingredients, which can be useful for the final product and/or for the production process of the final product. Such further ingredients can include, for example, colorants, fragrances, fillers, flavors, non-lecithin emulsifiers, stabilizers, and other lipophilic materials.

EXAMPLES

Materials. The rosemary extract used in examples 3-15 is available from, for example, Ecom Foods Industries Corporation (Ontario, Canada). The high oleic sunflower oil used in examples 3-15 is available, for example, from Humko oils (Memphis, TN) under the trade name TriSun®. TAP1010 Sun is available from Vitablend (Wolvega, the Netherlands). The soy lecithin used in the examples below is available, for example, from Archer Daniels Midland Co. (Decatur, IL) under the trade name Yelkin® Gold. The ascorbyl palmitate used in the examples below is available, for example, from DSM, Nutritional Products (Basel Switzerland).

Example 1

Preparation of high quality crude oil containing at least 30% of at least one PUFA having at least 4 carbon-carbon double bonds. A *Shizochytrium* sp. deposited under ATCC Accession No. PTA-10208 (hereinafter referred to as "PTA-10208") was grown via individual fermentation runs, as described below. Typical media and cultivation conditions are set forth in Table 1.

In carbon (glucose) and nitrogen-fed cultures with 1000 ppm Cl⁻ at 22.5° C. at pH 7.0 with 20% dissolved oxygen during the nitrogen feed and 10% dissolved oxygen thereafter, PTA-10208 produced a dry cell weight of 95 g/L after 200 hours of culture in a 10 L fermentor volume. The lipid yield was 53.7 g/L; the omega-3 yield was 37 g/L; the EPA yield was 14.3 g/L; and the DHA yield was 21 g/L. The fatty acid content was 57% by weight; the EPA content was 27.7% of FAME; and the DHA content was 39.1% of FAME. The lipid productivity was 6.4 g/L/day, and the omega-3 productivity was 4.4 g/L/day under these conditions, with 1.7 g/L/day EPA productivity and 2.5 g/L/day DHA productivity.

In carbon (glucose) and nitrogen-fed cultures with 1000 ppm Cl⁻ at 22.5° C. at pH 7.5 with 20% dissolved oxygen during the nitrogen feed and 10% dissolved oxygen thereafter, PTA-10208 produced a dry cell weight of 56 g/L after 139 hours of culture in a 10 L fermentor volume. The lipid yield was 53 g/L; the omega-3 yield was 34 g/L; the EPA yield was 11.5 g/L; and the DHA yield was 22 g/L. The fatty acid content was 58% by weight; the EPA content was 21.7% of FAME; and the DHA content was 41.7% of FAME. The lipid productivity was 9.2 g/L/day, and the omega-3 productivity was 5.9 g/L/day under these conditions, with 2 g/L/day EPA productivity and 3.8 g/L/day DHA productivity.

In carbon (glucose) and nitrogen-fed cultures with 1000 ppm Cl⁻ at 22.5° C. at pH 7.0 with 20% dissolved oxygen during the nitrogen feed and 10% dissolved oxygen thereafter, PTA-10208 produced a dry cell weight of 93.8 g/L after 167 hours of culture in a 2000 L fermentor volume. The lipid yield was 47.2 g/L; the omega-3 yield was 33.1 g/L; the EPA yield was 10.5 g/L; and the DHA yield was 20.4 g/L. The fatty acid content was 50.6% by weight; the EPA content was 23% of FAME; and the DHA content was 42.6% of FAME. The lipid productivity was 6.8 g/L/day, and the omega-3 productivity was 4.7 g/L/day under these conditions, with 1.5 g/L/day EPA productivity and 2.9 g/L/day DHA productivity.

In carbon (glucose) and nitrogen-fed cultures with 1000 ppm Cl⁻ at 22.5° C. at pH 7.0 with 20% dissolved oxygen during the nitrogen feed and 10% dissolved oxygen thereafter, PTA-10208 produced a dry cell weight of 105 g/L after 168 hours of culture in a 2000 L fermentor volume. The lipid yield was 46.4 g/L; the omega-3 yield was 33 g/L; the EPA yield was 10.7 g/L; and the DHA yield was 20.3 g/L. The fatty acid content was 43.9% by weight; the EPA content was 24% of FAME; and the DHA content was 43.7% of FAME. The lipid productivity was 6.6 g/L/day, and the omega-3 productivity was 4.7 g/L/day under these conditions, with 1.5 g/L/day EPA productivity and 2.9 g/L/day DHA productivity.

In carbon (glucose) and nitrogen-fed cultures with 1000 ppm Cl⁻ at 22.5° C. at pH 7.0 with 20% dissolved oxygen during the nitrogen feed and 10% dissolved oxygen thereafter, PTA-10208 produced a dry cell weight of 64.8 g/L after 168 hours of culture in a 2000 L fermentor volume. The lipid yield was 38.7 g/L; the omega-3 yield was 29.9 g/L; the EPA yield was 8.5 g/L; and the DHA yield was 16.7 g/L. The fatty acid content was 59.6% by weight; the EPA content was 23% of FAME; and the DHA content was 42.3% of FAME. The lipid productivity was 5.53 g/L/day, and the omega-3 productivity was 3.8 g/L/day under these conditions, with 1.2 g/L/day EPA productivity and 2.3 g/L/day DHA productivity.

TABLE 1

PTA-10208 Vessel Media and Typical Cultivation Conditions

| Ingredient | Concentration (g/L) | Ranges |
|---|---|---|
| $Na_2SO_4$ | 8.8 | 0-25, 2-20, or 3-10 |
| NaCl | 0.625 | 0-25, 0.1-10, or 0.5-5 |
| KCl | 1.0 | 0-5, 0.25-3, or 0.5-2 |
| $MgSO_4 \cdot 7H_2O$ | 5.0 | 0-10, 2-8, or 3-6 |
| $(NH_4)_2SO_4$ | 0.42 | 0-10, 0.25-5, or 0.05-3 |
| $CaCl_2$ | 0.29 | 0.1-5, 0.15-3, or 0.2-1 |
| T 154 (yeast extract) | 1.0 | 0-20, 0.1-10, or 0.5-5 |
| $KH_2PO_4$ | 1.765 | 0.1-10, 0.5-5, or 1-3 |

Post autoclave (Metals)

| Ingredient | Concentration (mg/L) | Ranges |
|---|---|---|
| Citric acid | 46.82 | 0.1-5000, 10-3000, or 40-2500 |
| $FeSO_4 \cdot 7H_2O$ | 10.30 | 0.1-100, 1-50, or 5-25 |
| $MnCl_2 \cdot 4H_2O$ | 3.10 | 0.1-100, 1-50, or 2-25 |
| $ZnSO_4 \cdot 7H_2O$ | 9.3 | 0.01-100, 1-50, or 2-25 |
| $CoCl_2 \cdot 6H_2O$ | 0.04 | 0-1, 0.001-0.1, or 0.01-0.1 |
| $Na_2MoO_4 \cdot 2H_2O$ | 0.04 | 0.001-1, 0.005-0.5, or 0.01-0.1 |
| $CuSO_4 \cdot 5H_2O$ | 2.07 | 0.1-100, 0.5-50, or 1-25 |
| $NiSO_4 \cdot 6H_2O$ | 2.07 | 0.1-100, 0.5-50, or 1-25 |

Post autoclave (Vitamins)

| Ingredient | Concentration (mg/L) | Ranges |
|---|---|---|
| Thiamine | 9.75 | 0.1-100, 1-50, or 5-25 |
| Ca½-pantothenate | 3.33 | 0.1-100, 0.1-50, or 1-10 |
| Biotin | 3.58 | 0.1-100, 0.1-50, or 1-10 |

TABLE 1-continued

PTA-10208 Vessel Media and Typical Cultivation Conditions

Post autoclave (Carbon

| Ingredient | Concentration (g/L) | Ranges |
|---|---|---|
| Glucose | 30.0 | 5-150, 10-100, or 20-50 |

Nitrogen Feed

| Ingredient | Concentration (mL/L) | Ranges |
|---|---|---|
| $NH_4OH$ | 23.6 | 0-150, 10-100, or 15-50 |

Typical cultivation conditions include (either alone or combination) would include the following:

| Condition | Ranges |
|---|---|
| pH | about 6.5-about 8.5, about 6.5-about 8.0, or about 7.0-about 8.0 |
| Temperature | about 17-about 30° C., about 20-about 28° C., or about 22 to about 24° C. |
| Dissolved oxygen | about 2-about 100% saturation, about 5-about 50% saturation, or about 7-about 20% saturation |
| Glucose controlled at | about 5-about 50 g/L, about 10-about 40 g/L, or about 20-about 35 g/L |

Example 2

Fatty Acid Profile of PTA-10208. Two samples of the biomass produced in accordance with Example 1 (PTA-10208 Sample #1 and PTA-10208 Sample #2) were analyzed for total crude oil content by solvent extraction, lipid classes were determined by high performance liquid chromatography/evaporative light scattering detection (HPLC/ELSD), triacylglycerol (TAG) was analyzed by HPLC/mass spectrometry (HPLC/MS), and fatty acid (FA) profiles were determined by gas chromatography with flame ionization detection (GC-FID). The crude lipid content of each freeze dried biomass was determined using solvent grinding with hexane and compared to the sum of FAME (mg/g) generated by direct transesterification, and the resultant fatty acid methyl esters (FAME) were quantified by GC/FID analysis. FAs in the extracted crude lipid were also quantified by transesterification and quantified using GC/FID analysis of the resultant FAME. The weight percent of all neutral lipids (NL) and free fatty acids (FFA) were determined in the extracted crude lipid using normal phase HPLC with ELSD and atmospheric pressure chemical ionization-MS (APCI-MS) identification. The method separates and quantifies sterol esters (SE), TAG, FFAs, 1,3-diacylglycerols (1,3-DAG), sterols, 1,2-diacylglycerols (1,2-DAG), and monoacylglycerols (MAG). Results are shown in Tables 2 and 3.

The TAG and phospholipids (PL) were isolated from the extracted crude oil (PTA-10208 Sample #1 and PTA-10208 Sample #2). TAG was isolated using low pressure flash chromatography and PL was isolated using solid phase extraction (SPE). The identity of each isolated fraction was confirmed by thin layer chromatography (TLC). The fatty acid profiles of the isolated TAG and PL fractions were determined following direct transesterification using GC-FID as FAME. Results are shown in Table 4.

Individual lipid classes were isolated from a sample of crude oil extracted from PTA-10208 (PTA-10208 Sample #3) using normal HPLC with ELSD and APCI-MS identification.

Experimental Procedures

Crude Oil Extraction—Crude oil was extracted from samples of freeze-dried biomass using solvent grinding. For example, approximately 3 grams of biomass was weighed into a Swedish tube. Three ball bearings and 30 mL of hexane were added to the Swedish tube, which was sealed with a neoprene stopper and placed in a shaker for 2 hours. The resultant slurry was filtered using a Buchner funnel and Whatman filter paper. The filtered liquid was collected, the solvent removed under vacuum, and the amount of remaining crude lipid determined gravimetrically.

Fatty Acid Analysis—The samples of biomass, extracted crude lipid, and isolated lipid classes were analyzed for fatty acid composition as FAME. Briefly, freeze-dried biomass and isolated lipid classes were weighed directly into a screw cap test tubes, while samples of the crude oil were dissolved in hexane to give a concentration of approximately 2 mg/mL. Toluene, containing internal standard, and 1.5 N HCl in methanol was added to each tube. The tubes were vortexed, then capped and heated to 100° C. for 2 hours. The tubes were allowed to cool, and saturated NaCl in water was added. The tubes were vortexed again and centrifuged to allow the layers to separate. A portion of the organic layer was then placed in a GC vial and analyzed by GC-FID. FAME was quantified using a 3-point calibration curve generated using Nu-Check-Prep GLC Reference Standard (NuCheck, Elysian, MN). Fatty acids present in the extract were expressed as mg/g and as a weight percent. Fat content in the samples was estimated assuming equal response to the internal standard when analyzed by GC-FID.

HPLC/ELSD/MS Method—

Instrument Agilent 1100 HPLC, Alltech 3300 ELSD, Agilent 1100 MSD

Column Phenomenex Luna Silica, 250×4.6 mm, 5 μm particle size w/Guard Column

Mobile Phase A—99.5% Hexanes (Omnisolv); 0.4% Isopropyl alcohol (Omnisolv); 0.1% Acetic Acid
B—99.9% Ethanol (Omnisolv, 95:5 Ethanol:IPA); 0.1% Acetic Acid Gradient

|  | 0 min | 5 min | 15 min | 20 min | 25 min | 26 min | 35 min |
|---|---|---|---|---|---|---|---|
| % A | 100 | 100 | 85 | 0 | 0 | 100 | 100 |
| % B | 0 | 0 | 10 | 100 | 100 | 0 | 0 |

Column Temp. 30° C.
Flow Rate 1.5 mL/min
Injection Volume 5 μL
ELSD Detection Temperature 35° C., Gas flow 1.2 L/min
MSD Mass Range 200-1200, Fragmentor 225 V; Drying Gas Temperature 350° C.; Vaporizer Temperature 325° C.; Capillary Voltage 3500 V; Corona Current 10 μA Solid Phase Extraction—PL fractions were separated from the crude lipid by solid phase extraction (SPE) using 2 g aminopropyl cartridges (Biotage, Uppsala, Sweden) placed in a Vac Elut apparatus (Varian Inc, Palo Alto, USA). The cartridge was conditioned with 15 mL of hexane, and ~60 mg of each sample was dissolved in 1 mL $CHCl_3$ and applied to the cartridge. The column was washed with 15 mL of 2:1 $CHCl_3$:isopropyl alcohol to elute all the neutral lipids, which was discarded. The fatty acids were then eluted with 15 mL of 2% acetic acid (HOAc) in ether, which was discarded. The PL portion was eluted with 15 mL of 6:1 Methanol:Chloroform, which was collected, dried under nitrogen, and weighed.

Flash Chromatography—Flash chromatography was used to separate the lipid classes present in the crude oil. Approximately 200 mg of crude oil dissolved in hexane was injected onto the head of the column. The chromatography system utilized Silica Gel 60 (EMD Chemical, Gibbstown, NJ) with mobile phase composed of Petroleum Ether and Ethyl Acetate at 5 mL/min (Tables 6-7) or 3 mL/min (Tables 8-13). A step gradient was used to selectively elute each lipid class from the column. The mobile phase gradient started from 100% petroleum ether and finished with 50% ethyl acetate. Fractions were collected in 10 mL test tubes using a Gilson FC 204 large-bed fraction collector (Gilson, Inc., Middleton, WI). Each tube was analyzed by thin layer chromatography (TLC) and the tubes containing individual lipid classes (as judged by single spots on TLC plate with expected retention factor (Rf)) were pooled, concentrated to dryness, and weighed. The total fraction content was then determined gravimetrically.

TLC Analysis—Thin layer chromatography was conducted on silica gel plates. The plates were eluted using a solvent system consisting of petroleum ether:ethyl ether:acetic acid (80:20:1) and were visualized using iodine vapor. The Rf values of each spot were then compared with reported literature values for each lipid class.

Analysis of TAG and PL Fractions—The isolated TAG and PL fractions were analyzed for fatty acid composition as fatty acid methyl esters (FAME). The TAG fractions were dissolved in hexane to give a concentration of approximately 1-2 mg/mL. 1 mL aliquots of the solutions were concentrated to dryness under nitrogen. Toluene, containing internal standard, and 1.5 N HCl in methanol was added to each tube. The tubes were vortexed, then capped and heated to 100° C. for 2 hours. Internal standard and HCl methanol were added directly to the tubes containing the PL fraction and heated. The tubes were allowed to cool, and saturated NaCl in water was added. The tubes were vortexed again and centrifuged to allow the layers to separate. A portion of the organic layer was then placed in a GC vial and analyzed by GC-FID. FAMEs were quantified using a 3-point calibration curve generated using Nu-Check-Prep GLC 502B Reference Standard (NuCheck, Elysian, MN). Fatty acids present in the extract were expressed as mg/g and as a % of FAME.

PTA-10208 Sample #1. The fatty acid profile of the biomass and extracted crude lipid for PTA-10208 Sample #1 was determined using GC/FID. FAs in the biomass were transesterified in situ by weighing 28.6 mg of biomass directly into a FAME tube, while a sample of the extracted crude lipid was prepared by weighing 55.0 mg of crude lipid into a 50 mL volumetric flask and transferring 1 ml to a separate FAME tube. The estimated crude lipid content of the biomass was determined to be 53.2% (as SUM of FAME) using GC with FID detection, while 52.0% (wt/wt) lipid was extracted from the dry biomass, giving a 97.8% recovery of total lipid. The crude lipid was determined to be 91.9% fatty acids (as SUM of FAME) using GC/FID. The major fatty acids contained in the crude lipid were C16:0 (182.5 mg/g), C20:5 n-3 (186.8 mg/g), and C22:6 n-3 (423.1 mg/g).

The lipid class profile of the extracted crude lipid was determined by weighing 55.0 mg of crude lipid into a 50 mL volumetric flask and transferring an aliquot into an HPLC vial for HPLC/ELSD/MS analysis. According to the HPLC/ELSD/MS analysis, the crude lipid contained 0.2% sterol esters (SE), 95.1% TAG, 0.4% sterols, and 0.5% 1,2-diacylglycerol (DAG). 5% of the TAG fraction included a peak that eluted directly after the TAG peak, but did not give a recognizable mass spectrum.

Isolated TAG from this sample as determined by flash chromatography made up approximately 92.4% of the crude oil. PL was not detected by weight or TLC after SPE isolation. The major fatty acids (>50 mg/g) contained in the TAG were C16:0 (189 mg/g), C20:5 n-3 (197 mg/g), and C22:6 n-3 (441 mg/g).

PTA-10208 Sample #2. The fatty acid profile of the biomass and extracted crude lipid for PTA-10208 Sample #2 was determined using GC/FID. FAs in the biomass were transesterified in situ by weighing 32.0 mg of biomass directly into a FAME tube, while a sample of the extracted crude lipid was prepared by weighing 60.1 mg of crude lipid into a 50 mL volumetric flask and transferring 1 ml to a separate FAME tube. The estimated crude lipid content of the biomass was determined to be 52.4% (as SUM of FAME) using GC with FID detection, while 48.0% (wt/wt) lipid was extracted from the dry biomass, giving a 91.7% recovery of total lipid. The crude lipid was determined to be 95.3% fatty acids (as SUM of FAME) using GC/FID. The major fatty acids contained in the crude lipid were C16:0 (217.5 mg/g), C20:5 n-3 (169.3 mg/g), and C22:6 n-3 (444.1 mg/g).

The lipid class profile of the extracted crude lipid was determined by weighing 60.1 mg of crude lipid into a 50 mL volumetric flask and transferring an aliquot into an HPLC vial for HPLC/ELSD/MS analysis. According to the HPLC/ELSD/MS analysis, the crude lipid contained 0.2% SE, 95.7% TAG, 0.3% sterols, and 0.7% 1,2-DAG. 5.1% of the TAG fraction included a peak that eluted directly after the TAG peak, but did not give a recognizable mass spectrum.

Isolated TAG from this sample made up approximately 93.9% of the crude oil. PL was not detected by weight or TLC after SPE isolation. The major fatty acids (>50 mg/g) contained in the TAG were C16:0 (218 mg/g), C20:5 n-3 (167 mg/g) and C22:6 n-3 (430 mg/g).

PTA-10208 Sample #3. A sample of crude oil from the microorganism deposited under ATCC Accession No. PTA-10208 (Sample PTA-10208 #3) was analyzed using HPLC/ELSD/MS. A total of 98.38% of lipids were recovered, with the sterol ester (SE) fraction accounting for 0.32%, the TAG fraction accounting for 96.13%, the 1,3-diacylglycerol (DAG) fraction accounting for 0.22%, the 1,2-DAG fraction accounting for 0.78%, and the sterol fraction accounting for 0.93%.

TABLE 3

Fatty Acid Profiles of PTA-10208 Biomasses and Extracted Crude Lipids (%)

| Fatty Acid | Sample #1 Biomass % FAME | Sample #1 Crude Lipid % FAME | Sample #2 Biomass % FAME | Sample #2 Crude Lipid % FAME |
|---|---|---|---|---|
| C12:0 | 0.28 | 0.27 | 0.35 | 0.33 |
| C14:0 | 2.20 | 2.22 | 3.22 | 3.29 |
| C14:1 | 0.00 | 0.00 | 0.00 | 0.00 |
| C15:0 | 0.46 | 0.41 | 0.69 | 0.66 |
| C16:0 | 19.93 | 20.11 | 22.70 | 23.07 |
| C16:1 | 0.00 | 0.00 | 0.01 | 0.00 |
| C18:0 | 1.02 | 0.99 | 0.92 | 0.89 |
| C18:1 n-9 | 0.00 | 0.36 | 0.00 | 0.33 |
| C18:1 n-7 | 0.00 | 0.00 | 0.00 | 0.00 |
| C18:2 n-6 | 0.00 | 0.00 | 0.00 | 0.00 |
| C20:0 | 0.28 | 0.20 | 0.27 | 0.20 |
| C18:3 n-3 | 0.00 | 0.00 | 0.00 | 0.00 |
| C20:1 n-9 | 0.00 | 0.00 | 0.00 | 0.00 |
| C18:4 n-3 | 0.17 | 0.18 | 0.21 | 0.21 |
| C20:2 n-6 | 0.00 | 0.00 | 0.00 | 0.00 |
| C20:3 n-6 | 0.00 | 0.00 | 0.00 | 0.00 |
| C22:0 | 0.02 | 0.00 | 0.01 | 0.00 |
| C20:4 n-7 | 0.15 | 0.05 | 0.13 | 0.04 |
| C20:4 n-6 ARA | 1.37 | 1.35 | 1.32 | 1.29 |
| C22:1 n-9 | 0.00 | 0.00 | 0.00 | 0.00 |
| C20:4 n-5 | 0.12 | 0.06 | 0.00 | 0.05 |
| C20:4 n-3 | 0.65 | 0.60 | 0.64 | 0.59 |
| C20:3 n-3 | 0.02 | 0.00 | 0.02 | 0.00 |
| C20:5 n-3 EPA | 20.36 | 20.59 | 17.93 | 17.96 |
| C22:4 n-9 | 0.00 | 0.00 | 0.00 | 0.00 |
| C24:0 | 0.11 | 0.00 | 0.10 | 0.00 |
| C24:1 n-9 | 0.29 | 0.36 | 0.16 | 0.22 |
| C22:5 n-6 | 1.83 | 1.75 | 1.98 | 1.91 |
| C22:5 n-3 | 3.88 | 3.87 | 1.91 | 1.86 |
| C22:6 n-3 DHA | 46.85 | 46.64 | 47.42 | 47.10 |
| Sum of FAME % | 100 | 100 | 100 | 100 |

TABLE 2

Fatty Acid Profiles of PTA-10208 Biomasses and Extracted Crude Lipids (mg/g)

| Fatty Acid | Sample #1 Biomass FAME (mg/g) | Sample #1 Crude Lipid FAME (mg/g) | Sample #2 Biomass FAME mg/g) | Sample #2 Crude Lipid FAME (mg/g) | Sample #1 Biomass Fatty Acid | Sample #1 Crude Lipid FAME (mg/g) | Sample #2 Biomass FAME (mg/g) | Sample #2 Crude Lipid FAME mg/g) |
|---|---|---|---|---|---|---|---|---|
| C12:0 | 1.47 | 2.43 | 1.80 | 3.14 | C22:0 | 0.10 | 0.00 | 0.08 |
| C14:0 | 11.62 | 20.12 | 16.72 | 31.03 | C20:4 n-7 | 0.81 | 0.45 | 0.67 |
| C14:1 | 0.00 | 0.00 | 0.00 | 0.00 | C20:4 n-6 | 7.22 | 12.23 | 6.84 |
| C15:0 | 2.43 | 3.75 | 3.60 | 6.22 | C22:1 n-9 | 0.00 | 0.00 | 0.00 |
| C16:0 | 105.04 | 182.47 | 117.72 | 217.49 | C20:4 n-5 | 0.63 | 0.52 | 0.00 |
| C16:1 | 0.00 | 0.00 | 0.06 | 0.01 | C20:4 n-3 | 3.45 | 5.45 | 3.33 |
| C18:0 | 5.37 | 8.96 | 4.77 | 8.37 | C20:3 n-3 | 0.09 | 0.00 | 0.11 |
| C18:1 n-9 | 0.00 | 3.26 | 0.00 | 3.09 | C20:5 n-3 | 107.31 | 186.83 | 92.99 |
| C18:1 n-7 | 0.00 | 0.00 | 0.00 | 0.00 | C22:4 n-9 | 0.00 | 0.00 | 0.00 |
| C18:2 n-6 | 0.00 | 0.00 | 0.00 | 0.00 | C24:0 | 0.60 | 0.00 | 0.52 |
| C20:0 | 1.48 | 1.79 | 1.40 | 1.85 | C24:1 n-9 | 1.55 | 3.26 | 0.85 |
| C18:3 n-3 | 0.00 | 0.00 | 0.00 | 0.00 | C22:5 n-6 | 9.66 | 15.84 | 10.27 |
| C20:1 n-9 | 0.00 | 0.00 | 0.00 | 0.00 | C22:5 n-3 | 20.44 | 35.13 | 9.92 |
| C18:4 n-3 | 0.91 | 1.61 | 1.10 | 2.00 | C22:6 n-3 | 246.98 | 423.10 | 245.96 |
| C20:2 n-6 | 0.00 | 3.00 | 0.00 | 0.00 | Sum of FAME (mg/g) | 527.15 | 907.18 | 518.71 |
| C20:3 n-6 | 0.00 | 0.00 | 0.00 | 0.00 | | | | |

TABLE 4

Fatty Acid Profiles of PTA-10208 Isolated TAG

| Fatty Acid | Sample #1 FAME (mg/g) | Sample #1 % FAME | Sample #2 FAME (mg/g) | Sample #2 % FAME |
|---|---|---|---|---|
| C12:0 | 2.57 | 0.27 | 3.35 | 0.36 |
| C14:0 | 21.07 | 2.23 | 31.37 | 3.41 |
| C14:1 | 0.00 | 0.00 | 0.00 | 0.00 |
| C15:0 | 3.89 | 0.41 | 6.17 | 0.67 |
| C16:0 | 189.28 | 20.07 | 218.78 | 23.75 |
| C16:1 | 0.00 | 0.00 | 0.00 | 0.00 |
| C18:0 | 9.21 | 0.98 | 8.07 | 0.88 |
| C18:1 n-9 | 3.35 | 0.36 | 3.64 | 0.40 |
| C18:1 n-7 | 0.00 | 0.00 | 0.00 | 0.00 |
| C18:2 n-6 | 0.00 | 0.00 | 0.00 | 0.00 |
| C20:0 | 1.86 | 0.20 | 1.55 | 0.17 |
| C18:3 n-3 | 0.00 | 0.00 | 0.00 | 0.00 |
| C20:1 n-9 | 0.00 | 0.00 | 0.00 | 0.00 |
| C18:4 n-3 | 1.64 | 0.17 | 2.00 | 0.22 |
| C20:2 n-6 | 0.00 | 0.00 | 0.00 | 0.00 |
| C20:3 n-6 | 0.00 | 0.00 | 0.00 | 0.00 |
| C22:0 | 0.00 | 0.00 | 0.00 | 0.00 |
| Unknown | 0.00 | 0.00 | 0.00 | 0.00 |
| C20:4 n-7 | 0.39 | 0.04 | 0.05 | 0.01 |
| C20:3 n-3 | 0.00 | 0.00 | 0.00 | 0.00 |
| C20:4 n-6 ARA | 12.79 | 1.36 | 11.82 | 1.28 |
| C22:1 n-9 | 0.00 | 0.00 | 0.00 | 0.00 |
| C20:4 n-5 | 0.39 | 0.04 | 0.07 | 0.01 |
| C20:4 n-3 | 5.52 | 0.59 | 5.09 | 0.55 |
| C20:5 n-3 EPA | 197.14 | 20.90 | 166.68 | 18.10 |
| C24:0 | 0.00 | 0.00 | 0.00 | 0.00 |
| C22:4 n-9 | 0.00 | 0.00 | 0.00 | 0.00 |
| C24:1 n-9 | 1.08 | 0.11 | <0.1 | <0.1 |
| C22:5 n-6 | 15.88 | 1.68 | 16.57 | 1.80 |
| C22:5 n-3 | 36.05 | 3.82 | 16.00 | 1.74 |
| C22:6 n-3 DHA | 440.99 | 46.76 | 429.83 | 46.67 |
| Sum of FAME (mg/g) | 943.11 | — | 921.03 | — |

Example 3

A crude oil can be obtained in accordance with the procedures set forth in examples 1 and 2. A crude oil can be further processed via refining, bleaching, and deodorizing to obtain refined oils. A refined oil can be further blended with high oleic sunflower oil ("HOSO") to achieve a final oil with a combined DHA+EPA content of at least about 400 mg/g oil. Typical characteristics of a final oil according to this example are set forth in Table 13.

TABLE 13

Characteristics of a Final Oil with combined DHA + EPA content of at least about 400 mg/g oil

| Chemical Characterstics | Specification | Result |
|---|---|---|
| DHA Content mg/g oil | Min. 240 | 255 |
| EPA Content mg/g oil | Min. 120 | 155 |
| DHA + EPA Content mg/g oil | Min. 400 | 411 |
| Peroxide Value meq/kg | Max. 5.0 | 0.4 |
| Ansidine Value | Max. 20 | <1 |
| Free Fatty Acid % | Max. 0.25 | 0.1 |
| Moisture and Volatiles % | Max. 0.02 | <0.01 |
| Unsaponifiable Matter % | Max. 4.5 | 0.9 |
| Trans-fatty Acids % | Max. 1 | <1 |
| ELEMENTAL COMPOSITION | | |
| Arsenic ppm | MAX 0.1 | <0.1 |
| Cadmium ppm | MAX 0.1 | <0.1 |

TABLE 13-continued

Characteristics of a Final Oil with combined DHA + EPA content of at least about 400 mg/g oil

| Chemical Characterstics | Specification | Result |
|---|---|---|
| Copper ppm | MAX 0.05 | <0.02 |
| Iron ppm | MAX 0.2 | 0.0 |
| Lead ppm | MAX 0.1 | <0.1 |
| Mercury ppm | MAX 0.04 | <0.01 |

Other ingredients contained in the oil include 1200 ppm sunflower lecithin; 2000 ppm rosemary extract; 2000 ppm mixed tocopherols; and 300 ppm ascorbyl palmitate. The 2000 ppm mixed tocopherol came from 1700 ppm of added tocopherols (includes 1100 ppm that was added during upstream processing), which is available from, for example, Vitablend (Wolvega, the Netherlands) under the trade name Tocoblend™ L70, and from the mixed tocopherols contained in the 3000 ppm of TAP 1010 Sun that was added to the oil. TAP1010 Sun provided 300 ppm ascorbyl palmitate, 300 ppm mixed tocopherols, and 1200 ppm sunflower lecithin.

Example 4

Final Oil containing Sunflower Lecithin, Rosemary Extract, Mixed Tocopherols, and Ascorbyl Palmitate. A crude oil can be obtained in accordance with the procedures set forth in examples 1 and 2. A crude oil can be further processed via refining, bleaching, and deodorizing to obtain refined oils. A refined oil can be further blended with HOSO to achieve a final oil with combined DHA+EPA content of at least about 500 mg/g oil. Typical characteristics of the final oil according to this example are set forth in Table 14.

TABLE 14

Characteristics of a Final Oil with combined DHA + EPA content of at least about 500 mg/g oil

| Chemical Characteristics | |
|---|---|
| DHA Content mg/g oil | Min. 320 |
| EPA Content mg/g oil | Min. 130 |
| DHA + EPA Content mg/g oil | Min. 500 |
| Peroxide Value meq/kg | Max. 5.0 |
| Ansidine Value | Max. 20 |
| Free Fatty Acid % | Max. 0.25 |
| Moisture and Volatiles % | Max. 0.02 |
| Unsaponifiable Matter % | Max. 4.5 |
| Trans-fatty Acids % | Max. 1 |
| ELEMENTAL COMPOSITION | |
| Arsenic ppm | MAX 0.1 |
| Cadmium ppm | MAX 0.1 |
| Copper ppm | MAX 0.05 |
| Iron ppm | MAX 0.2 |
| Lead ppm | MAX 0.1 |
| Mercury ppm | MAX 0.04 |

Other ingredients contained in the final oil include 1600 ppm sunflower lecithin; 2000 ppm Rosemary Extract; 2400 ppm mixed tocopherols; and 400 ppm ascorbyl palmitate. The 2400 ppm mixed tocopherol came from 2000 ppm of added tocopherols (which includes 900 ppm that was added in upstream processing), which is available from, for example, Vitablend (Wolvega, the Netherlands) under the trade name Tocoblend™ L70, and from the mixed tocopherols contained in the 4000 ppm of TAP 1010 Sun that was added to the oil. TAP1010 Sun provided 400 ppm ascorbyl palmitate, 400 ppm mixed tocopherols, and 1600 ppm sunflower lecithin.

Example 5

Final Oil containing Rosemary Extract, Mixed Tocopherols, and Ascorbyl Palmitate. A crude oil obtained in accordance with the procedures set forth in examples 1 and 2. A crude oil can be further processed via refining, bleaching, and deodorizing to obtain refined oils. A refined oil can be further blended with HOSO to achieve a final oil with combined DHA+EPA content of at least about 500 mg/g oil. The characteristics of the final oil according to this example are similar to the characteristics set forth in Table 14.

Other ingredients contained in the final oil include 3000 ppm Rosemary Extract; 1700 ppm mixed tocopherols (includes 900 ppm that was added during upstream processing), which is available from, for example, Vitablend (Wolvega, the Netherlands) under the trade name Tocoblend™ L70; and 250 ppm ascorbyl palmitate.

Example 6

The potency; fishy/marine aroma (smell); and fishy/marine aromatics (taste) of the final oils according to examples 4 and 5 were compared. The results of this comparison are set forth in Table 15.

The potency was obtained via the following protocol AOCS Ce 1b-89(modified). The marine/fishy aroma (smell) and marine/fishy aromatics (taste) sensory values were determined according to the method as described in Sensory Evaluation Techniques, Meilgaard et al., *CRC Press;* 4 edition (Dec. 13, 2006). A panel of 8-18 experienced people tasted and/or smelled a sample of the final oils according to examples 4 and 5. Each of these people determined the value of the sample. Afterwards all the values were averaged arithmetically and the result was rounded up or down to the next number. A value of ≥1.5 fishy/marine aroma and ≥2.5 fishy/marine aromatics is expected to be perceivable by the general population.

The final oils of each of examples 4a-d and 5 were packaged in 100 g epoxy-phenolic lined aluminium containers (Elemental Container Inc., part number MC 12532) with 25 mm natural poly plug inserts (Elemental Container Inc., part number 024PLUG) and stored at 25° C.

Example 7

A crude oil can be obtained from *Schizochytrium* sp via the processes described in, for example, WO 91/007498, WO 94/08467, WO 03/105606, and WO2011/153246. The crude oil can be further processed via refining, bleaching, and deodorizing to obtain refined oils. A refined oil can be further blended with HOSO to achieve a final oil with a DHA content of at least about 350 mg/g oil. Typical characteristics of final oil according to this example are set forth in Table 16.

TABLE 16

Characteristics of Final Oil with DHA content of at least about 350 mg/g

| | Concentration (wt/wt) |
|---|---|
| Fatty Acids | |
| 14:0 | 6%-12% |
| 16:0 | 18%-28% |
| 18:0 | Max 2% |
| 18:1 | Max 8% |
| 18:2 | Max 2% |
| 20:4 ARA | Max 2% |
| 20:5 EPA | Max 3% |
| 22:5n-6 DPA | 12%-18% |
| 22:6 DHA | Min. 35% |
| Others | Max 10% |
| Elemental Composition | |
| Arsenic | Max 0.2 ppm |
| Copper | Max 0.05 ppm |
| Iron | Max 0.2 ppm |
| Lead | Max 0.1 ppm |
| Mercury | Max 0.04 ppm |
| Chemical Characteristics | |
| Peroxide value | Max 5 meq/kg |
| Free fatty acid | Max 0.25% |
| Moisture and Volatiles | Max 0.05% |
| Unsaponifiable Matter | Max 4.5% |
| Trans fatty acids | Max 1% |

Example 7a. Other ingredients contained in the final oil include 900 ppm mixed tocopherols that was added during upstream processing. The mixed tocopherols are available from, for example, Vitablend (Wolvega, the Netherlands) under the trade name Tocoblend™ L70.

TABLE 15

| | Time (months) | Example 4a | Example 4b | Example 4c | Example 4d | Average of Examples 4a-d | Example 5 |
|---|---|---|---|---|---|---|---|
| DHA potency (mg/g) | 0 | 359 | 354 | 382 | 348 | 361 | 360 |
| | 3 | 372 | 365 | 394 | 346 | 369 | 362 |
| EPA potency (mg/g) | 0 | 199 | 213 | 179 | 158 | 187 | 178 |
| | 3 | 202 | 218 | 184 | 160 | 191 | 162 |
| Fishy/marine aroma | 0 | 1 | 0 | 0 | 1 | 1 | 0 |
| | 1 | 2 | 1 | 1 | 1 | 1 | 0 |
| | 2 | 1 | 1 | 1 | 2 | 1 | 1 |
| | 3 | 1 | 1 | 1 | 3 | 2 | 1 |
| | 4 | 2 | 1 | 1 | 2 | 2 | 1 |
| | 5 | 2 | 1 | 2 | 2 | 2 | 2 |
| Fishy/marine aromatics | 0 | 1 | 0 | 0 | 1 | 1 | 0 |
| | 1 | 2 | 1 | 1 | 1 | 1 | 0 |
| | 2 | 2 | 1 | 2 | 2 | 2 | 1 |
| | 3 | 1 | 2 | 2 | 3 | 2 | 1 |
| | 4 | 2 | 2 | 1 | 3 | 2 | 2 |
| | 5 | 3 | 2 | 2 | 3 | 3 | 3 |

Example 7b. Other ingredients contained in the final oil include 900 ppm mixed tocopherols that was added during upstream processing; 400 ppm ascorbyl palmitate; and 2800 ppm soy lecithin. The mixed tocopherols are available from, for example, Vitablend (Wolvega, the Netherlands) under the trade name Tocoblend™ L70.

Example 7c. Other ingredients contained in the final oil include 900 ppm mixed tocopherols that was added during upstream processing; 750 ppm ascorbyl palmitate; and 2800 ppm soy lecithin. The mixed tocopherols are available from, for example, Vitablend (Wolvega, the Netherlands) under the trade name Tocoblend™ L70.

Example 7d. Other ingredients contained in the final oil include 2800 ppm soy lecithin; 3500 ppm Rosemary Extract; 1400 ppm mixed tocopherols; and 50 ppm ascorbyl palmitate. The 1400 ppm mixed tocopherols (includes 900 ppm that was added during upstream processing), which is available from, for example, Vitablend (Wolvega, the Netherlands) under the trade name Tocoblend™ L70.

Example 7e. Other ingredients contained in the final oil include 2800 ppm Soy Lecithin; 3500 ppm Rosemary Extract; 1400 ppm mixed tocopherols; and 750 ppm ascorbyl palmitate. The 1400 ppm mixed tocopherols includes 900 ppm that was added upstream, which is available from, for example, Vitablend (Wolvega, the Netherlands) under the trade name Tocoblend™ L70.

Example 7f. Other ingredients contained in the final oil include 2800 ppm Soy Lecithin; 3500 ppm Rosemary Extract; 3400 ppm mixed tocopherols; and 50 ppm ascorbyl palmitate. The 1400 ppm mixed tocopherols (includes 900 ppm that was added during upstream processing), which is available from, for example, Vitablend (Wolvega, the Netherlands) under the trade name Tocoblend™ L70.

Example 7g. Other ingredients contained in the final oil include 2800 ppm Soy Lecithin; 3500 ppm Rosemary Extract; 3400 ppm mixed tocopherols; and 750 ppm ascorbyl palmitate. The 1400 ppm mixed tocopherols (includes 900 ppm that was added during upstream processing) is available from, for example, Vitablend (Wolvega, the Netherlands) under the trade name Tocoblend™ L70.

Example 7h. Other ingredients contained in the final oil include 1400 ppm mixed tocopherols (includes 900 ppm that was added during upstream processing), which is available from, for example, Vitablend (Wolvega, the Netherlands) under the trade name Tocoblend™ L70; and 500 ppm Rosemary Extract.

Example 7i. Other ingredients contained in the final oil include 2800 ppm soy lecithin; 500 ppm Rosemary Extract; 1400 ppm mixed tocopherols (includes 900 ppm that was added during upstream processing), which is available from, for example, Vitablend (Wolvega, the Netherlands) under the trade name Tocoblend™ L70; and 50 ppm ascorbyl palmitate.

Example 7j. Other ingredients contained in the final oil include 2800 ppm soy lecithin; 500 ppm Rosemary Extract; 1400 ppm mixed tocopherols (includes 900 ppm that was added during upstream processing), which is available from, for example, Vitablend (Wolvega, the Netherlands) under the trade name Tocoblend™ L70; and 750 ppm ascorbyl palmitate.

Example 7k. Other ingredients contained in the final oil include 2800 ppm soy lecithin; 500 ppm Rosemary Extract; 3400 ppm mixed tocopherols (includes 900 ppm that was added during upstream processing), which is available from, for example, Vitablend (Wolvega, the Netherlands) under the trade name Tocoblend™ L70; and 50 ppm ascorbyl palmitate.

Example 7L. Other ingredients contained in the final oil include 2800 ppm soy lecithin; 500 ppm Rosemary Extract; 3400 ppm mixed tocopherols (includes 900 ppm that was added during upstream processing), which is available from, for example, Vitablend (Wolvega, the Netherlands) under the trade name Tocoblend™ L70; and 750 ppm ascorbyl palmitate.

Example 7m. Other ingredients contained in the final oil include 2800 ppm soy lecithin; 2000 ppm Rosemary Extract; 2400 ppm mixed tocopherols (includes 900 ppm that was added during upstream processing), which is available from, for example, Vitablend (Wolvega, the Netherlands) under the trade name Tocoblend™ L70; and 400 ppm ascorbyl palmitate.

Example 8

Final Oil containing Rosemary Extract and Mixed Tocopherols. A crude oil can be obtained from *Schizochytrium* sp via the processes described in, for example, WO 91/007498, WO 94/08467, WO 03/105606, and WO2011/153246. The crude oil can be further processed via refining, bleaching, and deodorizing to obtain refined oils. The refined oil can be further blended with HOSO to achieve final oil with DHA content of at least about 350 mg/g oil. The characteristics of this oil are similar to the characteristics set forth in Table 16.

Example 8a. Other ingredients contained in the final oil include 3400 ppm mixed tocopherols (includes 900 ppm that was added during upstream processing), which is available from, for example, Vitablend (Wolvega, the Netherlands) under the trade name Tocoblend™ L70; and 500 ppm Rosemary Extract. Table 17 summarizes the oil according to this example that does not contain ascorbyl palmitate or lecithin.

TABLE 17

| Ingredients | | | Amount: 96.1% Fat with |
|---|---|---|---|
| oil comprising at least one $C_{18-22}$ polyunsaturated fatty acids having 4 to 6 carbon-carbon double bonds | ARA | 20:4 n-6 | 1.06% |
| | EPA | 20:5 n-3 | 1.10% |
| | DPA | 22:5 n-6 | 17.54% |
| | DPA | 22:5 n-3 | 0.57% |
| | DHA | 22:6 n-3 | 44.74% |
| | | Total about 65.01 wt-% | |
| Tocopherol | | 3,400 ppm | |
| Rosemary extract | | 500 ppm | |
| High oleic acids | | 7.8% | |

Example 8b. Other ingredients contained in the final oil include 1400 ppm mixed tocopherols (includes 900 ppm that was added during upstream processing), which is available from, for example, Vitablend (Wolvega, the Netherlands) under the trade name Tocoblend™ L70; and 3500 ppm Rosemary Extract. Table 18 summarizes the oil according to this example that does not contain ascorbyl palmitate or lecithin.

TABLE 18

| Ingredients | | | Amount: 96.7% Fat with |
|---|---|---|---|
| oil comprising at least one $C_{18-22}$ polyunsaturated fatty acids having 4 to 6 carbon-carbon double bonds | ARA | 20:4 n-6 | 1.06% |
| | EPA | 20:5 n-3 | 1.12% |
| | DPA | 22:5 n-6 | 17.46% |
| | DPA | 22:5 n-3 | 0.57% |
| | DHA | 22:6 n-3 | 44.46% |
| | | Total about 64.67 wt-% | |
| Tocopherol | | 1,400 ppm | |
| Rosemary extract | | 3,500 ppm | |
| High oleic acids | | 7.8% | |

Example 8c. Other ingredients contained in the final oil include 3400 ppm mixed tocopherols (includes 900 ppm that was added during upstream processing), which is available from, for example, Vitablend (Wolvega, the Netherlands) under the trade name Tocoblend™ L70; and 3500 ppm Rosemary Extract. Table 19 summarizes the oil according to this example that does not contain ascorbyl palmitate or lecithin.

TABLE 19

| Ingredients | Amount: 95.3% Fat with | | |
|---|---|---|---|
| oil comprising at least one $C_{18-22}$ polyunsaturated fatty acids having 4 to 6 carbon-carbon double bonds | ARA | 20:4 n-6 | 1.07% |
| | EPA | 20:5 n-3 | 1.10% |
| | DPA | 22:5 n-6 | 17.55% |
| | DPA | 22:5 n-3 | 0.57% |
| | DHA | 22:6 n-3 | 44.70% |
| | Total about 64.99 wt-% | | |
| Tocopherol | 3,400 ppm | | |
| Rosemary extract | 3,500 ppm | | |
| High oleic acids | 7.5% | | |

Example 8d. Other ingredients contained in the final oil include 2400 ppm mixed tocopherols (includes 900 ppm that was added during upstream processing), which is available from, for example, Vitablend (Wolvega, the Netherlands) under the trade name Tocoblend™ L70; and 2000 ppm Rosemary Extract. Table 20 summarizes the oil according to this example that does not contain ascorbyl palmitate or lecithin.

TABLE 20

| Ingredients | Amount: 95.9% Fat with | | |
|---|---|---|---|
| oil comprising at least one $C_{18-22}$ polyunsaturated fatty acids having 4 to 6 carbon-carbon double bonds | ARA | 20:4 n-6 | 1.06% |
| | EPA | 20:5 n-3 | 1.09% |
| | DPA | 22:5 n-6 | 17.49% |
| | DPA | 22:5 n-3 | 0.56% |
| | DHA | 22:6 n-3 | 44.51% |
| | Total about 64.71 wt-% | | |
| Tocopherol | 2,400 ppm | | |
| Rosemary extract | 2,000 ppm | | |
| High oleic acids | 7.8% | | |

Example 8e. Other ingredients contained in the final oil include 2400 ppm mixed tocopherols (includes 900 ppm that was added during upstream processing), which is available from, for example, Vitablend (Wolvega, the Netherlands) under the trade name Tocoblend™ L70; and 0 ppm Rosemary Extract. Table 21 summarizes the oil according to this example that does not contain ascorbyl palmitate, lecithin, or rosemary extract.

TABLE 21

| Ingredients | Amount: 95.8% Fat with | | |
|---|---|---|---|
| oil comprising at least one $C_{18-22}$ polyunsaturated fatty acids having 4 to 6 carbon-carbon double bonds | ARA | 20:4 n-6 | 1.06% |
| | EPA | 20:5 n-3 | 1.09% |
| | DPA | 22:5 n-6 | 17.47% |
| | DPA | 22:5 n-3 | 0.56% |
| | DHA | 22:6 n-3 | 44.48% |
| | Total about 64.66 wt-% | | |
| Tocopherol | 2,400 ppm | | |
| Rosemary extract | 0 ppm | | |
| High oleic acids | 8.0% | | |

Example 8f. Other ingredients contained in the final oil include 900 ppm mixed tocopherols (that was added during upstream processing), which is available from, for example, Vitablend (Wolvega, the Netherlands) under the trade name Tocoblend™ L70; and 2000 ppm Rosemary Extract. Table 22 summarizes the oil according to this example that does not contain ascorbyl palmitate or lecithin.

TABLE 22

| Ingredients | Amount: 96.6% Fat with | | |
|---|---|---|---|
| oil comprising at least one $C_{18-22}$ polyunsaturated fatty acids having 4 to 6 carbon-carbon double bonds | ARA | 20:4 n-6 | 1.06% |
| | EPA | 20:5 n-3 | 1.09% |
| | DPA | 22:5 n-6 | 17.48% |
| | DPA | 22:5 n-3 | 0.57% |
| | DHA | 22:6 n-3 | 44.51% |
| | Total about 64.71 wt-% | | |
| Tocopherol | 900 ppm | | |
| Rosemary extract | 2,000 ppm | | |
| High oleic acids | 8.0% | | |

Example 8g. Other ingredients contained in the final oil include 2400 ppm mixed tocopherols (includes 900 ppm that was added during upstream processing), which is available from, for example, Vitablend (Wolvega, the Netherlands) under the trade name Tocoblend™ L70; and 2000 ppm Rosemary Extract. Table 23 summarizes the oil according to this example that does not contain ascorbyl palmitate or lecithin.

TABLE 23

| Ingredients | Amount: 97.2% Fat with | | |
|---|---|---|---|
| oil comprising at least one $C_{18-22}$ polyunsaturated fatty acids having 4 to 6 carbon-carbon double bonds | ARA | 20:4 n-6 | 1.06% |
| | EPA | 20:5 n-3 | 1.12% |
| | DPA | 22:5 n-6 | 17.46% |
| | DPA | 22:5 n-3 | 0.56% |
| | DHA | 22:6 n-3 | 44.44% |
| | Total about 64.64 wt-% | | |
| Tocopherol | 2,400 ppm | | |
| Rosemary extract | 2,000 ppm | | |
| High oleic acids | 7.8% | | |

Example 9

TABLE 24a

| Examples | Marine/fishy aroma sensory value | Rancimat Value |
|---|---|---|
| 8a | 1.4 @ 6 Mths RT | 5.6 |
| 8b | 0.9 @ 8 Mths RT | 5.3 |
| 8c | 1.2 @ 8 Mths RT | 5.8 |
| 8d | 1.2 @ 6 Mths RT | 5.5 |
| 8e | 1.3 @ 6 Mths RT | 4.1 |
| 8f | 1.3 @ 7 Mths RT | 4.1 |
| 8g | 1.4 @ 6 Mths RT | 5.2 |

TABLE 24b

| | Time (months) | Ex. 7a | Ex. 7b | Ex. 7c | Ex. 7d | Ex. 7e | Ex. 7f | Ex. 7g | Ex. 7h | Ex. 7i | Ex. 7j | Ex. 7k |
|---|---|---|---|---|---|---|---|---|---|---|---|---|
| DHA potency (mg/g) | 0 | 427 | 370 | 371 | 368 | 368 | 365 | 375 | 428 | 368 | 365 | 366 |
| | 6 | 438 | 368 | 368 | 360 | 368 | 368 | 370 | 425 | 368 | 371 | 377 |
| Fishy/marine aroma | 0 | 0.3 | 1.0 | 0.8 | 0.8 | 0.3 | 0.8 | 0.3 | 0.5 | 1.4 | 0.5 | 1.4 |
| | 1 | 0.3 | 1.6 | 0.7 | 0.8 | 1.3 | 1.1 | 1.1 | 0.3 | 1.8 | 1.3 | 1.9 |
| | 2 | 0.6 | 1.4 | 0.5 | 1.2 | 1.0 | 1.0 | 1.2 | 0.7 | 1.7 | 1.1 | 1.6 |
| | 3 | 1.2 | 1.6 | 1.7 | 1.6 | 1.7 | 1.8 | 1.8 | 1.1 | 2.3 | 1.7 | 2.3 |
| | 4 | 1.6 | 1.9 | 1.1 | 1.7 | 1.6 | 1.5 | 1.9 | 1.6 | 2.2 | 1.4 | 2.2 |
| | 5 | 1.5 | 1.9 | 1.2 | 1.8 | 1.7 | 2.0 | 1.6 | 1.1 | 2.2 | 2.2 | 2.3 |
| | 6 | 1.5 | 1.9 | 1.2 | 2.3 | 2.1 | 2.5 | 2.0 | 1.6 | 2.3 | 2.2 | 2.5 |
| | 7 | 1.8 | 2.2 | 1.7 | 2.1 | 2.1 | 2.0 | 2.2 | 1.6 | 2.4 | 2.2 | 2.5 |
| | 8 | — | 2.2 | 1.5 | 2.1 | 2.2 | 2.2 | 2.2 | 1.8 | 2.9 | 2.5 | 2.6 |
| Fishy/marine aromatics | 0 | 0.7 | 1.3 | 1.2 | 0.9 | 0.6 | 0.9 | 0.5 | 0.7 | 1.7 | 0.9 | 1.4 |
| | 1 | 0.7 | 2.5 | 1.1 | 1.1 | 1.2 | 1.1 | 1.4 | 0.6 | 2.3 | 1.4 | 2.5 |
| | 2 | 1.2 | 2.1 | 0.7 | 1.5 | 1.1 | 1.1 | 1.7 | 1.1 | 2.2 | 1.4 | 2.1 |
| | 3 | 1.6 | 2.4 | 2.4 | 1.9 | 2.1 | 2.1 | 2.1 | 1.6 | 2.8 | 2.1 | 2.8 |
| | 4 | 2.0 | 2.4 | 1.5 | 2.0 | 2.1 | 1.9 | 2.2 | 1.9 | 2.9 | 2.3 | 3.0 |
| | 5 | 2.0 | 2.4 | 1.5 | 2.2 | 2.1 | 2.4 | 2.1 | 1.6 | 2.9 | 2.6 | 2.8 |
| | 6 | 2.2 | 2.5 | 1.8 | 2.7 | 2.6 | — | 2.4 | 2.2 | 3.1 | 2.7 | 3.2 |
| | 7 | 2.5 | 2.8 | 1.9 | 2.6 | 2.4 | 2.6 | 2.5 | 2.4 | 3.1 | 2.6 | 3.2 |
| | 8 | — | 2.7 | 1.5 | 2.6 | 2.8 | 3.0 | 2.5 | 2.6 | 3.8 | 3.0 | 3.4 |

TABLE 24c

| | Time (months) | Ex. 7L | Ex. 7m(i) | Ex 7m(ii) | Ex 7m(iii) | Ex. 8a | Ex. 8b | Ex. 8c | Ex. 8d | Ex. 8e | Ex. 8f | Ex. 8g |
|---|---|---|---|---|---|---|---|---|---|---|---|---|
| DHA potency (mg/g) | 0 | 363 | 364 | 377 | 373 | 430 | 430 | 426 | 427 | 426 | 430 | 432 |
| | 6 | 365 | 367 | 368 | 370 | 430 | 425 | 430 | 432 | 429 | 425 | 430 |
| Fishy/marine aroma | 0 | 0.4 | 0.6 | 0.3 | 0.6 | 0.5 | 0.3 | 0.2 | 0.5 | 0.3 | 0.3 | 0.2 |
| | 1 | 1.0 | 1.2 | 0.9 | 0.8 | 0.4 | 0.5 | 0.5 | 0.5 | 0.3 | 0.5 | 0.3 |
| | 2 | 1.3 | 0.8 | 1.0 | 0.9 | 0.6 | 0.7 | 0.6 | 0.6 | 0.3 | 0.7 | 0.5 |
| | 3 | 1.8 | 1.7 | 1.5 | 1.3 | 1.2 | 0.8 | 1.0 | 1.0 | 0.8 | 0.8 | 1.0 |
| | 4 | 2.0 | 1.7 | 1.4 | 1.5 | 1.4 | 1.2 | 1.1 | 1.2 | 1.3 | 1.3 | 1.1 |
| | 5 | 1.8 | 1.7 | 1.8 | 1.6 | 1.3 | 1.0 | 1.1 | 1.0 | 0.8 | 1.0 | 1.1 |
| | 6 | 2.3 | 2.5 | 2.2 | 1.7 | 1.4 | 1.3 | 1.2 | 1.3 | 1.3 | 1.4 | 1.4 |
| | 7 | 2.0 | 2.1 | 1.9 | 2.0 | 1.7 | 1.2 | 1.4 | 1.5 | 1.6 | 1.4 | 1.5 |
| | 8 | 2.5 | 2.5 | — | 2.3 | 2.9 | 0.9 | 1.2 | 1.9 | 1.7 | 1.6 | — |
| | 9 | — | — | — | — | — | 1.3 | 1.9 | — | — | 1.8 | — |
| Fishy/marine aromatics | 0 | 0.7 | 0.8 | 0.5 | 0.8 | 0.8 | 0.5 | 0.4 | 0.6 | 0.5 | 0.5 | 0.5 |
| | 1 | 1.3 | 1.3 | 1.2 | 1.0 | 0.8 | 0.6 | 0.5 | 0.6 | 0.6 | 0.6 | 0.5 |
| | 2 | 1.5 | 1.2 | 1.1 | 1.2 | 1.1 | 0.8 | 0.7 | 0.8 | 0.7 | 0.8 | 1.0 |
| | 3 | 2.3 | 2.1 | 1.9 | 1.9 | 1.5 | 0.9 | 1.2 | 1.2 | 1.5 | 1.0 | 1.2 |
| | 4 | 2.4 | — | 2.1 | — | 1.9 | 1.3 | 1.5 | 1.4 | 1.7 | 1.4 | 1.3 |
| | 5 | 2.4 | 2.2 | 2.2 | 2.2 | 1.8 | 1.4 | 1.4 | 1.5 | 1.3 | 1.3 | 1.6 |
| | 6 | 2.8 | — | — | — | 2.1 | 1.4 | 1.5 | 1.5 | 1.9 | 1.6 | 1.8 |
| | 7 | 2.7 | — | 2.5 | — | 2.1 | 1.4 | 1.7 | 1.7 | 2.3 | 1.9 | 2.1 |
| | 8 | 3.0 | 3.0 | — | 2.9 | 3.1 | 1.3 | 1.9 | 2.4 | 2.4 | 2.1 | — |
| | 9 | — | — | — | — | — | 1.9 | 2.5 | — | — | 2.3 | — |

The Rancimat values are determined by the standard test for oil stability, using a rancimat apparatus operated at 90° C., with airflow set at 10 L/hour (AOCS Cd 12b-92). The potency was obtained via the following protocol AOCS Ce 1b-89(modified). The marine/fishy aroma (smell) and marine/fishy aromatics (taste) sensory values were determined according to the method as described in Sensory Evaluation Techniques, Meilgaard et al., *CRC Press;* 4 edition (Dec. 13, 2006). A panel of 8-18 experienced people tasted and/or smelled a sample a sample of the final oils according to examples 7a-m and 8a-g. Each of these people determined the value of the sample. Afterwards all the values were averaged arithmetically and the result was rounded up or down to the next number. A value of ≥1.5 fishy/marine aroma and ≥2.5 fishy/marine aromatics is expected to be perceivable by the general population.

The final oils of examples 7a-m and 8a-g were packaged in in Nylon/Foil/PE Low Density Polyethylene bags packaged with vacuum then heat sealed under $N_2$ on a Model AGV Multivac. (Multivac Sepp Haggenmüller GmbH & Co. KG) and stored at 25° C.

Example 10

Final Oil containing Sunflower Lecithin, Rosemary Extract, Mixed Tocopherols, and Ascorbyl Palmitate. A crude oil can be obtained from *Schizochytrium* sp via the processes described in, for example, WO 91/007498, WO 94/08467, WO 03/105606, and WO2011/153246. The crude oil can be further processed via refining, bleaching, and deodorizing to obtain refined oils. The refined oil can be further blended with HOSO to achieve a final oil with DHA content of at least about 350 mg/g oil. Typical characteristics of the final oil according to this example are set forth in Table 25.

TABLE 25

Characteristics of Final Oil with DHA content of at least about 350 mg/g oil

Chemical Characteristics

| | |
|---|---|
| DHA Content mg/g oil | Min. 350 |
| Peroxide Value meq/kg | Max. 5.0 |
| Ansidine Value | Max. 20 |
| Free Fatty Acid % | Max. 0.25 |
| Moisture and Volatiles % | Max. 0.05 |
| Unsaponifiable Matter % | Max. 4.5 |
| Trans-fatty Acids % | Max. 1 |

ELEMENTAL COMPOSITION

| | |
|---|---|
| Arsenic ppm | MAX 0.1 |
| Cadmium ppm | MAX 0.1 |
| Copper ppm | MAX 0.05 |
| Iron ppm | MAX 0.2 |
| Lead ppm | MAX 0.1 |
| Mercury ppm | MAX 0.04 |

Examples 10a-10e. Other ingredients contained in the final oil include 1600 ppm Sunflower Lecithin; 2000 ppm Rosemary Extract; 2400 ppm mixed tocopherols; and 400 ppm ascorbyl palmitate. The 2400 ppm mixed tocopherols came from 2000 ppm of added tocopherols (includes 900 ppm that was added during upstream processing), which is available from, for example, Vitablend (Wolvega, the Netherlands) under the trade name Tocoblend™ L70, and from the mixed tocopherols contained in the 4000 ppm of TAP 1010 Sun that was added to the oil. TAP1010 Sun provided 400 ppm ascorbyl palmitate, 400 ppm mixed tocopherols, and 1600 ppm sunflower lecithin.

Example 11

Final Oil containing Rosemary Extract, Mixed Tocopherols, and Ascorbyl Palmitate. A crude oil can be obtained from *Schizochytrium* sp via the processes described in, for example, WO 91/007498, WO 94/08467, WO 03/105606, and WO2011/153246. The crude oil can be further processed via refining, bleaching, and deodorizing to obtain refined oils. The refined oil can be further blended with HOSO to achieve final oil with DHA content of at least about 400 mg/g oil. The characteristics of the final oil according to this example are similar to the characteristics set forth in Table 26.

Examples 11a-b. Other ingredients contained in the final oil include 3000 ppm Rosemary Extract; 1700 ppm mixed tocopherols (includes 900 ppm that was added during upstream processing), which is available from, for example, Vitablend (Wolvega, the Netherlands) under the trade name Tocoblend™ L70; and 250 ppm ascorbyl palmitate.

Example 12

The potency; fishy/marine aroma (smell); and fishy/marine aromatics (taste) of the final oils according to examples 10a-e and 11a-b were compared. The results of this comparison are set forth in Table 27.

The potency was obtained via the following protocol AOCS Ce 1b-89(modified). The marine/fishy aroma (smell) and marine/fishy aromatics (taste) sensory values were determined according to the method as described in Sensory Evaluation Techniques, Meilgaard et al., *CRC Press;* 4 edition (Dec. 13, 2006). A panel of 8-18 experienced people tasted and/or smelled a sample of the final oils according to examples 10a-e and 11a-b. Each of these people determined the value of the sample. Afterwards all the values were averaged arithmetically and the result were rounded up or down to the next number. A value of ≥1.5 fishy/marine aroma and ≥2.5 fishy/marine aromatics is expected to be perceivable by the general population.

The final oils of each of examples 10a-d and 11a were packaged in 100 g epoxy-phenolic lined aluminium containers (Elemental Container Inc., part number MC 12532) with 25 mm natural poly plug inserts (Elemental Container Inc., part number 024PLUG) and stored at 25° C.

The final oils of each of examples 10e and 11b were packaged in 300 g heat-sealed nylon-foil bags with low density polyethylene (LDPE) lining (manufactured by Heritage Packaging) and stored at room temperature (25° C.).

TABLE 27

| | Time (months) | Example 10a | Example 10b | Example 10c | Example 10d | Average of Examples 10a-d | Example 10e | Example 11a | Example 11b |
|---|---|---|---|---|---|---|---|---|---|
| DHA potency (mg/g) | 0 | 354 | 364 | 363 | 371 | 363 | 421 | 416 | 420 |
| | 3 | 355 | 356 | 354 | 366 | 358 | 418 | 417 | 419 |
| Fishy/marine aroma | 0 | 1 | 0 | 0 | 1 | 1 | 0 | 1 | 0 |
| | 1 | 2 | 1 | 1 | 1 | 1 | 1 | 1 | 0 |
| | 2 | 1 | 1 | 1 | 2 | 1 | 1 | 1 | 1 |
| | 3 | 1 | 1 | 1 | 3 | 2 | 2 | 2 | 1 |
| Fishy/marine aromatics | 0 | 1 | 0 | 0 | 1 | 1 | 1 | 1 | 0 |
| | 1 | 2 | 1 | 1 | 1 | 1 | 2 | 2 | 1 |
| | 2 | 2 | 1 | 2 | 2 | 2 | 1 | 2 | 1 |
| | 3 | 1 | 2 | 2 | 3 | 2 | 2 | 2 | 2 |

Example 13

Final Oil containing Sunflower Lecithin, Rosemary Extract, Mixed Tocopherols, and Ascorbyl Palmitate. A crude oil can be obtained from *Schizochytrium* sp via the processes described in, for example, WO 91/007498, WO 94/08467, WO 03/105606, and WO2011/153246. The crude oil can be further processed via refining, bleaching, and deodorizing to obtain refined oils. The refined oil can be blended with HOSO to achieve a final oil with DHA content of at least about 400 mg/g oil. Typical characteristics of the final oil according to this example are set forth in Table 28.

TABLE 28

Characteristics of a Final Oil with DHA content of at least about 400 mg/g oil

Chemical Characteristics

| | |
|---|---|
| DHA Content mg/g oil | Min. 400 |
| Peroxide Value meq/kg | Max. 5.0 |
| Ansidine Value | Max. 20 |
| Free Fatty Acid % | Max. 0.25 |
| Moisture and Volatiles % | Max. 0.05 |

TABLE 28-continued

Characteristics of a Final Oil with DHA content of at least about 400 mg/g oil

| Chemical Characteristics | |
| --- | --- |
| Unsaponifiable Matter % | Max. 4.0 |
| Trans-fatty Acids % | Max. 1 |
| ELEMENTAL COMPOSITION | |
| Arsenic ppm | MAX 0.1 |
| Cadmium ppm | MAX 0.1 |
| Copper ppm | MAX 0.05 |
| Iron ppm | MAX 0.2 |
| Lead ppm | MAX 0.1 |
| Mercury ppm | MAX 0.04 |

Other ingredients contained in the final oil include 2000 ppm Rosemary Extract; 2400 ppm mixed tocopherols; 400 ppm ascorbyl palmitate; and 1600 ppm sunflower lecithin. The 2400 ppm mixed tocopherol came from 2000 ppm of added tocopherols (includes 900 ppm that was added upstream), which is available from, for example, Vitablend (Wolvega, the Netherlands) under the trade name Tocoblend™ L70, and from the mixed tocopherols contained in the 4000 ppm of TAP 1010 Sun that was added to the oil. TAP1010 Sun provided 400 ppm ascorbyl palmitate, 400 ppm mixed tocopherols, and 1600 ppm sunflower lecithin.

Example 14

Final Oil containing Rosemary Extract, Mixed Tocopherols, and Ascorbyl Palmitate. A crude oil can be obtained from *Schizochytrium* sp via the processes described in, for example, WO 91/007498, WO 94/08467, WO 03/105606, and WO2011/153246. The crude oil can be further processed via refining, bleaching, and deodorizing to obtain refined oils. The refined oil can be further blended with HOSO to achieve final oil with DHA content of at least about 400 mg/g oil. The characteristics of final oil according to this example are similar to the characteristics set forth in Table 28.

Example 14a. Other ingredients contained in the final oil include 2000 ppm Rosemary Extract; 1700 ppm mixed tocopherols (includes 900 ppm that was added upstream), which is available from, for example, Vitablend (Wolvega, the Netherlands) under the trade name Tocoblend™ L70; and 250 ppm ascorbyl palmitate.

Example 14b and 14c. Other ingredients contained in the final oil include 3000 ppm Rosemary Extract; 1700 ppm mixed tocopherols (includes 900 ppm that was added upstream), which is available from, for example, Vitablend (Wolvega, the Netherlands) under the trade name Tocoblend™ L70; and 250 ppm ascorbyl palmitate.

Example 14d. Other ingredients contained in the final oil include 5000 ppm Rosemary Extract; 1700 ppm mixed tocopherols (includes 900 ppm that was added upstream), which is available from, for example, Vitablend (Wolvega, the Netherlands) under the trade name Tocoblend™ L70; and 250 ppm ascorbyl palmitate.

Example 15

Final Oil containing Organic Rosemary Extract and Mixed Tocopherols. A crude oil can be obtained from *Schizochytrium* sp via the processes described in, for example, WO 91/007498, WO 94/08467, WO 03/105606, and WO2011/153246. The crude oil can be further processed via refining, bleaching, and deodorizing to obtain refined oils. The refined oil can be further blended with organic HOSO, which is available from, for example, Adams Vegetables Oils, Inc, (Arbuckle, California) to achieve a final oil with DHA content of at least about 400 mg/g oil. Typical characteristics of the final oil according to this example are set forth in Table 29.

TABLE 29

Characteristics of a Final Oil with DHA content of at least about 400 mg/g oil

| Chemical Characteristics | |
| --- | --- |
| DHA Content mg/g oil | Min. 400 |
| Peroxide Value meq/kg | Max. 5.0 |
| Ansidine Value | Max. 20 |
| Free Fatty Acid % | Max. 0.25 |
| Moisture and Volatiles % | Max. 0.02 |
| Unsaponifiable Matter % | Max. 4.0 |
| Trans-fatty Acids % | Max. 1 |
| ELEMENTAL COMPOSITION | |
| Arsenic ppm | MAX 0.1 |
| Cadmium ppm | MAX 0.1 |
| Copper ppm | MAX 0.05 |
| Iron ppm | MAX 0.2 |
| Lead ppm | MAX 0.1 |
| Mercury ppm | MAX 0.04 |

Example 15a. Other ingredients contained in the final oil include 750 ppm Rosemary Extract, which is available from, for example, Vitiva (Markovic, Slovenia) under the trade name Inolens® 4 organic and Naturex, (Avignon, France) under the trade name organic StabilEnhance® OSR-4; and 1700 ppm mixed tocopherols (includes 900 ppm that was added during upstream processing), which is available from, for example, Vitablend (Wolvega, the Netherlands) under the trade name Tocoblend™ L70.

Example 15b. Other ingredients contained in the final oil include 2000 ppm Rosemary Extract, which is available from, for example, Vitiva (Markovic, Slovenia) under the trade name Inolens® 4 organic and Naturex, (Avignon, France) under the trade name organic StabilEnhance® OSR-4; and 2400 ppm mixed tocopherols (includes 900 ppm that was added upstream), which is available from, for example, Vitablend (Wolvega, the Netherlands) under the trade name Tocoblend™ L70.

Example 16

The potency; fishy/marine aroma (smell); and fishy/marine aromatics (taste) of the final oils according to examples 13, 14, and 15 were compared. The results of this comparison are set forth in Table 30.

The potency was obtained via the following protocol AOCS Ce 1b-89(modified). The marine/fishy aroma (smell) and marine/fishy aromatics (taste) sensory values were determined according to the method as described in Sensory Evaluation Techniques, Meilgaard et al., *CRC Press*; 4 edition (Dec. 13, 2006). A panel of 8-18 experienced people tasted and/or smelled a sample of the oils according to examples 13, 14, and 15. Each of these people determined the value of the sample. Afterwards all the values were averaged arithmetically and the result was rounded up or down to the next number. A value of ≥1.5 fishy/marine aroma and ≥2.5 fishy/marine aromatics is expected to be perceivable by the general population.

The final oils of each of examples 13 and 14a-d were packaged in 300 g heat-sealed nylon-foil bags with low density polyethylene (LDPE) lining (manufactured by Heritage Packaging) and stored at 25° C.

The final oils of each of examples 15a-b were packaged in 100 g epoxy-phenolic lined aluminium containers (Elemental Container Inc., part number MC 12532) with 25 mm natural poly plug inserts (Elemental Container Inc., part number 024PLUG) and stored at 25° C.

TABLE 30

|  | Time (months) | Example 13 | Example 14a | Example 14b | Example 14c | Example 14d | Example 15a | Example 15b |
|---|---|---|---|---|---|---|---|---|
| DHA potency (mg/g) | 0 | 420 | 420 | 425 | 423 | 426 | 439 | 423 |
|  | 3 | 421 | 419 | 415 | 416 | 420 | 428 | 428 |
| Fishy/marine aroma | 0 | 0 | 0 | 0 | 0 | 0 | 0 | 0 |
|  | 1 | 1 | 0 | 1 | 0 | 1 | 1 | 1 |
|  | 2 | 1 | 1 | 1 | 1 | 1 | — | — |
|  | 3 | 2 | 2 | 2 | 2 | 1 | — | — |
|  | 4 | 2 | 2 | 1 | 2 | 2 | — | — |
|  | 5 | 2 | 2 | 2 | 2 | 2 | — | — |
| Fishy/marine aromatics | 0 | 0 | 0 | 0 | 0 | 0 | 0 | 0 |
|  | 1 | 1 | 1 | 1 | 1 | 1 | 2 | 2 |
|  | 2 | 2 | 1 | 1 | 1 | 1 | — | — |
|  | 3 | 2 | 2 | 3 | 2 | 2 | — | — |
|  | 4 | 3 | 2 | 2 | 2 | 2 | — | — |
|  | 5 | 3 | 2 | 3 | 2 | 2 | — | — |

What is claimed is:

1. An oil comprising
   (a) at least 30 wt. % of polyunsaturated fatty acids having at least 4 double bonds,
      wherein the polyunsaturated fatty acids having at least 4 double bonds comprise a mixture of docosahexaenoic acid (DHA), omega-6 docosapentaenoic acid (DPA n-6), and eicosapentaenoic acid (EPA);
   (b) at least one first antioxidant,
      wherein the at least one first antioxidant comprises a tocopherol in an amount ranging from about 900 ppm to about 3400 ppm;
   (c) less than 10 ppm lecithin; and
   (d) less than 1 ppm of an ascorbic acid derivative,
   wherein the oil has a peroxide value (POV) of from 0.4 to 5, an anisidine value (AnV) less than 20, and a Rancimat value of from 4.1 to 19.

2. The oil of claim 1, wherein said oil comprises less than 30 ppb iron.

3. The oil of claim 1, wherein said oil further comprises a flavoring reagent.

4. The oil of claim 3, wherein said flavoring reagent is rosemary extract.

5. The oil of claim 1, wherein said oil has a fishy aromatics sensory value of less than 1.5.

6. The oil of claim 1, wherein said oil has a fishy aromatics sensory value of less than 2.5.

7. The oil of claim 1, wherein said at least one first antioxidant comprises an additional tocopherol.

8. The oil of claim 1, wherein said at least one first antioxidant comprises a mixed tocopherol.

9. The oil of claim 1, wherein said oil is obtained from at least one microalgae, fish, plant, seed, or combinations thereof.

10. The oil of claim 9, wherein said oil is obtained from the at least one microalgae and the at least one microalgae comprises microalgae from the order Thraustochytriales.

11. The oil of claim 10, wherein said microalgae is a *Thraustochytrium* sp., *Schizochytrium* sp., or combinations thereof.

12. The oil of claim 1, wherein said oil is obtained from a plant.

13. The oil of claim 1, wherein said oil is obtained from fish.

14. A final oil comprising the oil of claim 1 and at least one further oil.

15. The final oil of claim 14, wherein said further oil is a vegetable oil.

16. The final oil of claim 1, wherein said oil is an edible oil.

17. A food product comprising the oil of claim 1.

18. The oil of claim 1, wherein said oil comprises at least 35 wt. % of DHA.

19. The oil of claim 1, wherein said oil has a fishy aromatics value of less than 1.5 at a time period between 0-9 months.

20. The oil of claim 1, wherein said oil has a fishy aromatics value of less than 2.5 at a time period between 0-9 months.

21. The oil of claim 1, wherein said oil comprises tocopherol in an amount ranging from about 1000 ppm to 3000 ppm.

22. The oil of claim 1, wherein said oil comprises an additional tocopherol ranging from about 300 ppm to about 1000 ppm.

23. The oil of claim 1, wherein said oil further comprises rosemary extract in an amount ranging from 1500 ppm to 5000 ppm.

24. The oil of claim 1, wherein said oil has an anisidine value (AnV) less than 10.

25. The oil of claim 1, wherein said oil comprises at least 40 wt. % of DHA.

26. The oil of claim 1, wherein said oil comprises at least 45 wt. % of DHA.

27. The oil of claim 1, wherein said oil comprises at least 50 wt. % of DHA.

28. The oil of claim 1, wherein said oil comprises less than 80 wt. % of DHA.

29. The oil of claim 1, wherein said oil comprises less than 70 wt. % of DHA.

30. The oil of claim 1, wherein said oil comprises less than 60 wt. % of DHA.

31. The oil of claim 1, wherein said oil further comprises arachidonic acid (ARA).

32. An oil from at least one microalgae from the order Thraustochytriales, comprising (a) at least 30 wt. % of polyunsaturated fatty acids having at least 4 double bonds,
   wherein the polyunsaturated fatty acids having at least 4 double bonds comprise a mixture of docosahexaenoic acid (DHA), omega-6 docosapentaenoic acid (DPA n-6), and eicosapentaenoic acid (EPA);
(b) at least one first antioxidant,
   wherein the at least one first antioxidant is a tocopherol and the oil comprises tocopherol in an amount ranging from about 900 ppm to about 3400 ppm; and
(c) less than 10 ppm lecithin, and
(d) less than 1 ppm of an ascorbic acid derivative,
   wherein the oil has a peroxide value (POV) of from 0.4 to 5, an anisidine value (AnV) less than 20, and a Rancimat value of from 4.1 to 19.

* * * * *